US012651356B1

(12) United States Patent
Saxena et al.

(10) Patent No.: US 12,651,356 B1
(45) Date of Patent: Jun. 9, 2026

(54) SYSTEM AND METHOD FOR DETECTING A CHANGE IN CONTEXT OF AN APPLICATION

(71) Applicant: Whatfix Private Limited, Bangalore (IN)

(72) Inventors: Sneha Saxena, Bangalore (IN); Muthukrishnan Thukkaram, Bangalore (IN)

(73) Assignee: Whatfix Private Limited, Bangalore (IN)

( * ) Notice: Subject to any disclaimer, the term of this patent is extended or adjusted under 35 U.S.C. 154(b) by 248 days.

(21) Appl. No.: 18/478,379

(22) Filed: Sep. 29, 2023

(51) Int. Cl.
 *G06T 7/246* (2017.01)
 *G06V 10/75* (2022.01)

(52) U.S. Cl.
 CPC ............ *G06T 7/248* (2017.01); *G06V 10/751* (2022.01)

(58) Field of Classification Search
 CPC .............................. G06T 7/248; G06V 10/751
 See application file for complete search history.

(56) References Cited

U.S. PATENT DOCUMENTS

| | | | |
|---|---|---|---|
| 9,218,267 B1 | 12/2015 | Keller | |
| 9,342,759 B1 * | 5/2016 | Chen ..................... | G06F 18/217 |
| 9,898,444 B1 | 2/2018 | Rybakov | |
| 11,947,915 B1 | 4/2024 | Shen | |
| 2017/0178348 A1 * | 6/2017 | Shen ......................... | G06T 5/50 |
| 2022/0198513 A1 * | 6/2022 | Huang ..................... | G06T 7/20 |
| 2024/0394080 A1 | 11/2024 | Kusch | |
| 2025/0045514 A1 * | 2/2025 | Zohar ..................... | G06F 40/30 |

FOREIGN PATENT DOCUMENTS

| | | |
|---|---|---|
| CN | 115731406 A | 3/2023 |

OTHER PUBLICATIONS

Radinsky, Kira, and Paul N. Bennett. "Predicting content change on the web." Proceedings of the sixth ACM international conference on Web search and data mining. 2013.https://dl.acm.org/doi/abs/10.1145/2433396.2433448 (Year: 2013).*

* cited by examiner

*Primary Examiner* — Han Hoang
(74) *Attorney, Agent, or Firm* — Patent Law Works, LLP

(57) ABSTRACT

A digital adoption platform includes a page change identification technique. The page change identification technique is platform and application agnostic. Changes in screenshots of a UI of an application are compared. Differences between screenshots are compared using a cross-correlation technique. Trigger conditions are defined to reduce the computational resources required. Additional optimizations to reduce processing resources and optimize accuracy may also be included.

21 Claims, 17 Drawing Sheets

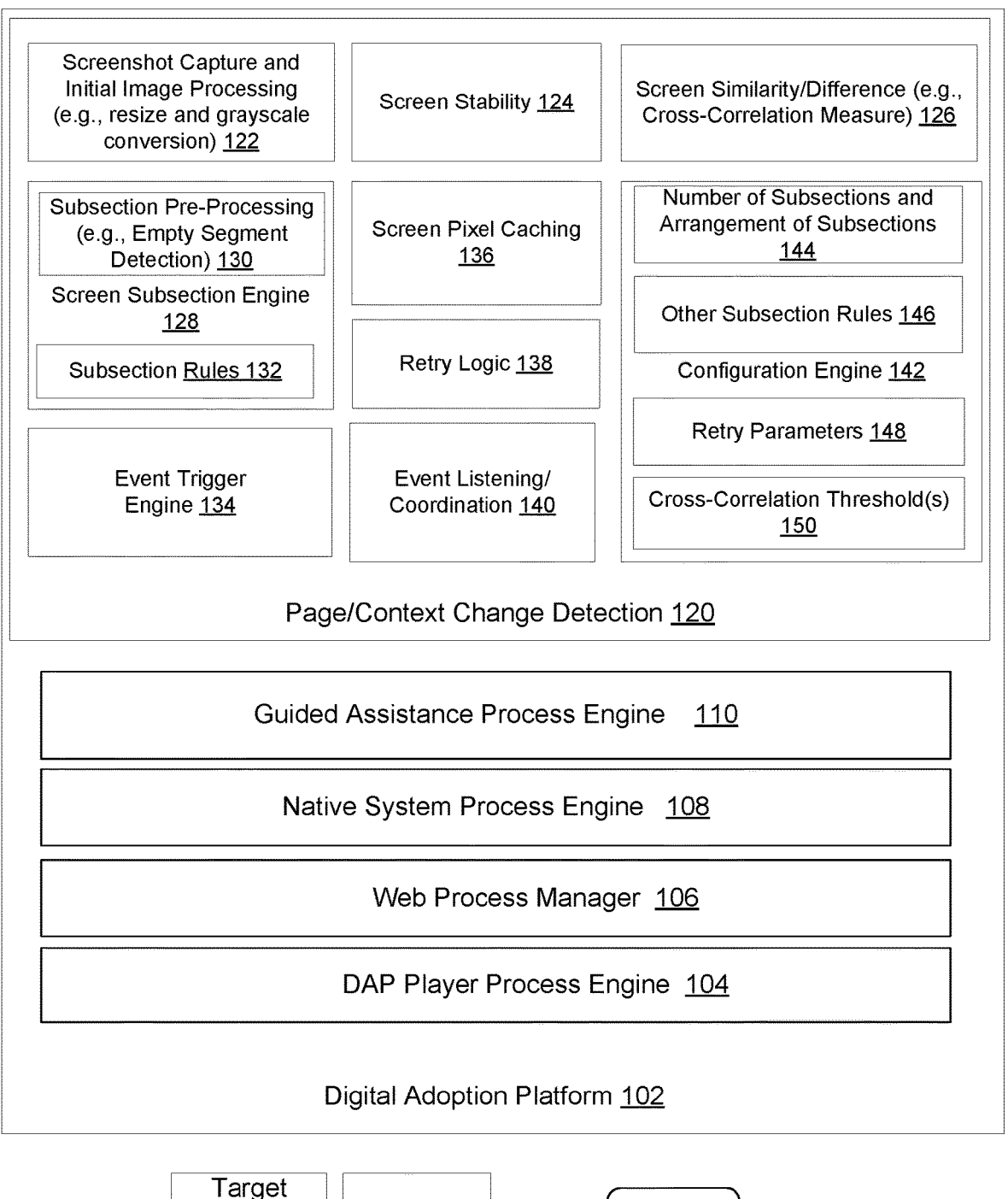

Screenshot Capture and Initial Image Processing (e.g., resize and grayscale conversion) 122

Screen Stability 124

Screen Similarity/Difference (e.g., Cross-Correlation Measure) 126

Subsection Pre-Processing (e.g., Empty Segment Detection) 130

Screen Pixel Caching 136

Number of Subsections and Arrangement of Subsections 144

Screen Subsection Engine 128

Subsection Rules 132

Retry Logic 138

Other Subsection Rules 146

Configuration Engine 142

Retry Parameters 148

Event Trigger Engine 134

Event Listening/ Coordination 140

Cross-Correlation Threshold(s) 150

Page/Context Change Detection 120

Guided Assistance Process Engine   110

Native System Process Engine   108

Web Process Manager  106

DAP Player Process Engine  104

Digital Adoption Platform 102

Target Client Application 101

Application GUI 102

| Focus Event | UI Reorder Event | Keyboard Event (Tab/Esc/Enter) | Mouse Event (Mouse Up) | Process? |
|---|---|---|---|---|
| Yes | No | Yes | No | Yes |
| Yes | No | No | Yes | Yes |
| Yes | No | Yes | Yes | Yes |
| Yes | No | No | No | No |
| No | Yes | Yes | No | Yes |
| No | Yes | No | Yes | Yes |
| No | Yes | Yes | Yes | Yes |
| No | Yes | No | No | No |

Fig. 3A $$r = \frac{\sum (x_i - \bar{x})(y_i - \bar{y})}{\sqrt{\sum (x_i - \bar{x})^2 \sum (y_i - \bar{y})^2}}$$

$r$  = correlation coefficient $x_i$ = values of the x-variable in a sample $\bar{x}$ = mean of the values of the x-variable $y_i$ = values of the y-variable in a sample $\bar{y}$ = mean of the values of the y-variable

| Communication Unit 1304 |
| Processor 13108 |
| Input Device 1312 |
| Output Device 1314 |

Memory 1310

Data Store 1320

SYSTEM AND METHOD FOR DETECTING A CHANGE IN CONTEXT OF AN APPLICATION

TECHNICAL FIELD

The present disclosure is related to determining a change in a page or context of an application for use in a digital adoption platform.

BACKGROUND

A digital adoption platform (DAP) is a type of software that is layered on top of another software, app, or website to help facilitate end user proficiency by helping to guide users through key tasks and provide contextual information as users navigate the user interface of the product. Users are provided with information to help familiarize them and become more proficient. This helps to drive adoption.

For example, a DAP may generate a help tip. Background information on an example DAP implementation is found in various sources, including U.S. Pat. Nos. 11,372,661 and 11,461,090, assigned to Whatfix Private Limited, the contents of each of which is hereby incorporated by reference. A DAP supports content authoring modules and content playback modules to generate, for example, smart tips as a user navigates elements of a user interface of an underlying software application.

A DAP supports content creators creating new flows or other guided features to enable higher adoption of client applications. Content Creators of the product can create content, record a flow, and the content is played back the same flow as and when required when end-user clients navigate the client application. This requires the DAP to find the visual UI elements on the application the user is looking at (e.g., finding where the user's cursor is located on a graphical user interface.

An application may have different pages with different screen element formats. For example, an application may generate graphical user interfaces with pages for different purposes, such as a calendar page, a teleconference page, etc. Also, even for a visual UI for a particular purpose (e.g., document management), there may be a variety of different pages for different features that have variations in the arrangement or display of user interface elements. That is, as a user navigates an application, there may be major changes in the visual UI as well as minor changes in the visual UI. For either case, the DAP needs to know what page the user is looking at to provide the correct smart tip.

Consequently, a DAP needs to know what page the user is looking at to aid in understanding visual UI elements on the application that the user is looking at. Conventionally, identifying pages on a desktop application relies on Automation API Interfaces for different technologies like SAP-GUI, UIAutomation, Java Access Bridge etc. However, this is a slow process because uniquely identifying the pages is a memory and CPU intensive task. This makes the process unusable on minimum configuration machines. Some of the problems with these approaches include that each technology like WinForm, SAPGui, Java Swings app needs a different library and algorithm to identify the elements. Additionally, automation APIs are slow and are CPU intensive so identifying context takes time in every technology.

The current state of the art for detecting a change in a page or a context of an application is based on primarily three approaches:

1) Window foreground change,
2) Window title change, and
3) Unique user interface element on the page.

These three approaches are achieved through System level and Object level events generated by the operating system. System-level events describe situations affecting all applications in the system. Object-level events pertain to situations specific to objects (UI elements) within one application.

The events used in the current state of the art to identify a change in context of the active client application are:

A. EVENT_SYSTEM_FOREGROUND: In this approach, the event when raised by the operating system depicts a change in the foreground. The system sends this event even if the foreground window has changed to another window in the same thread;

B. EVENT_OBJECT_NAMECHANGE: In this approach, the system sends this event for the following user interface elements: check box, cursor, list-view control, push button, radio button, status bar control, tree view control, and window object. This can be used to determine if there is any change in the title of the current window. This is specifically useful when there is no change in the foreground but the page within the current window is changed; and C. UIAutomation Element Visibility: This approach looks for an element on the page using properties which denote a single element on a page. For example, consider looking for an element with object level properties like Name-Chat and AutomationID-Chat0021 at regular intervals. When an element with the given properties is found, an assumption can be made that the current page is a Chat window. Elements that are unique to a particular context of application are chosen further to identify change of context. Properties such as name, automation id, control type, etc., of these unique elements are then classified to identify context that is required for segmentation, where segmentation is a technique to customize DAP experiences based on individual or group preferences or needs.

The above system and object events are usually sufficient when building applications which are not context aware. Digital adoption platforms like Whatfix DAP rely heavily on the context of the application to provide relevant and most accurate help content on the page. Smart Tips, Beacons, Guided Walkthroughs are all built around the context of the application, so a highly accurate algorithm is an integral part of a DAP solution.

The above events suffer from the drawback that it's impractical to achieve a high accuracy in terms of identifying the context with close to 100% accuracy. There are four basic challenges.

First, one obstacle is that most applications do not have reliable titles sufficient to identify if a context change has happened. Some legacy applications built using WinForms have a single title throughout all pages. This makes title-based identification of context useless.

Second, in some customer applications, the applications do not raise any title change event even when there is a visible change in the title. This usually happens when the system cannot detect a title change due to the way the application is built by the developers.

Third, foreground change events are usually the most accurate when it comes to context change identification when the entire window is changed. But on some customer applications a foreground change event is triggered when the user hovers over certain UI elements on a page. Certain UI elements creating a system help text tooltip which is also considered a new window by the operating system. This triggers an unwanted foreground change event causing the DAP application to re-check the current page context. This can be partially mitigated by various means, including checking the size of the window which raised the foreground change event.

Fourth, the UI Automation based approach for looking at certain elements on all pages at regular intervals has two main issues. One is that it is a CPU intensive operation, so it can be used judiciously and only when customers have better than average hardware. Second is that this requires a lot of manual effort by a technical person to identify unique elements on all required pages. This work cannot be done by the content author as this is a highly technical work.

Due to the above four challenges, page context change detection remains a difficult task with low accuracy.

SUMMARY

A digital adoption platform includes a page change identification technique. The page change identification technique is platform and application agnostic. Changes in screenshots of a UI of an application are compared. In one implementation, differences between screenshot are compared using a cross-correlation technique. In one implementation, trigger conditions are defined to reduce the computational resources required.

In one implementation, an example method for detecting page changes of a graphical user interface (GUI) application screen includes determining if a trigger condition is satisfied for a page change, the trigger condition being based on a combination of events associated with a likely page change of an application. Subsequent to satisfying the trigger condition, the method includes capturing a sequence of at least two screenshots of the application taken at different times and comparing the at least two screenshots using a cross correlation function. The method includes identifying a page change in response to the cross-correlation function having a value below a threshold value indicative of a page change.

In one implementation, the cross-correlation function is evaluated based on a reference screenshot captured in response to the trigger condition and a subsequent screenshot.

In one implementation, the trigger condition comprises operating system events.

In one implementation, the trigger condition comprises a combination of reorder events, focus events, mouse events, and keyboard events.

In one implementation, the trigger condition comprises a first trigger condition comprising detecting mouse events and keyboard events followed by a second trigger condition comprising detecting reorder events and focus events.

In one implementation, the threshold value is a range between 0.5 to 1.0.

In one implementation, a stability test is performed, based on screenshots of the application, to determine if the user interface is stable.

In one implementation, the stability test is based on performing a cross-correlation check for at least two screenshots taken after detecting a change in page content.

In one implementation, the method includes performing at least one retry if the cross-correlation function does not have a value below a threshold value indicative of a page change.

In one implementation, the sequence of at least two consecutive screenshots is converted into grayscale images to reduce the number of dimensions for analysis.

One implementation includes caching grayscale versions of at least a first screenshot in the sequence of at least two consecutive screenshots.

In one implementation, the sequence of at least two consecutive screenshots comprises screenshots of at least two different color images, with the cross-correlation function being performed on color images.

In one implementation the identification of a page change is utilized to trigger a digital adoption platform to recognize page changes.

A system for identifying page changes of a graphical user interface, comprising:

a page change identification engine configured to determining if a trigger condition is satisfied for a page change, the trigger condition being based on a combination of events associated with a likely page change of an application;

subsequent to satisfying the trigger condition, capturing a sequence of at least two screenshots of the application taken at different times and comparing the at least two screenshots using a cross correlation function; and identifying a page change in response to the cross-correlation function having a value below a threshold value indicative of a page change.

In one implementation of the system, the cross-correlation function is evaluated based on a reference screenshot captured in response to the trigger condition and a subsequent screenshot.

In one implementation of the system, the trigger condition comprises operating system events.

In one implementation of the system, the trigger condition comprises a combination of reorder events, focus events, mouse events, and keyboard events.

In one implementation of the system, the trigger condition comprises a first trigger condition comprising detecting mouse events and keyboard events followed by a second trigger condition comprising detecting reorder events and focus events.

In one implementation of the system, the threshold value is in a range between 0.5 to 1.0.

In one implementation of the system, the system further performs a stability test, based on screenshots of the application, to determine if the user interface is stable.

In one implementation of the system, a stability test is based on performing a cross-correlation check for at least two screenshots taken after detecting a change in page content.

In one implementation of the system, the system further performs at least one retry if the cross-correlation function does not have a value below a threshold value indicative of a page change.

In one implementation of the system, a sequence of at least two consecutive screenshots is converted into grayscale images to reduce the number of dimensions for analysis.

In one implementation of the system, the system caches grayscale versions of at least a first screenshot in the sequence of at least two consecutive screenshots.

In one implementation of the system, the cross-correlation function is performed on screenshots of color images.

In one implementation of the system, the system utilizes the page change identification information for a digital adoption platform to recognize page changes for which guidance is provided by the digital adoption platform.

Another example of method of detecting page changes of a graphical user interface (GUI) application screen includes determining if a trigger condition is satisfied for a page change, the trigger condition being based on a combination of events associated with a likely page change of an application. Subsequent to satisfying the trigger condition, capturing a sequence of at least two screenshots of the application taken at different times, and comparing the at least two screenshots using a cross correlation function. The method includes identifying a page change in response to the cross-correlation function having a value below a first threshold value indicative of a page change. The method includes evaluating page stability using a stability score. The method further includes in response to identifying a page change and that the page is stable, using the identified page change to trigger delivery of guidance to a user of the application via a digital adoption platform.

BRIEF DESCRIPTION OF THE DRAWINGS

FIG. 1 is a high-level drawing of a DAP system illustrating components to identify page changes of an application in accordance with an implementation.

FIG. 3A is high-level flow chart illustrating an example of operating system events, keyboard events, and mouse events for triggering a page identification process in accordance with an implementation.

FIG. 3B illustrates an example of a cross-correlation function in accordance with an implementation.

DETAILED DESCRIPTION

Figure 2:
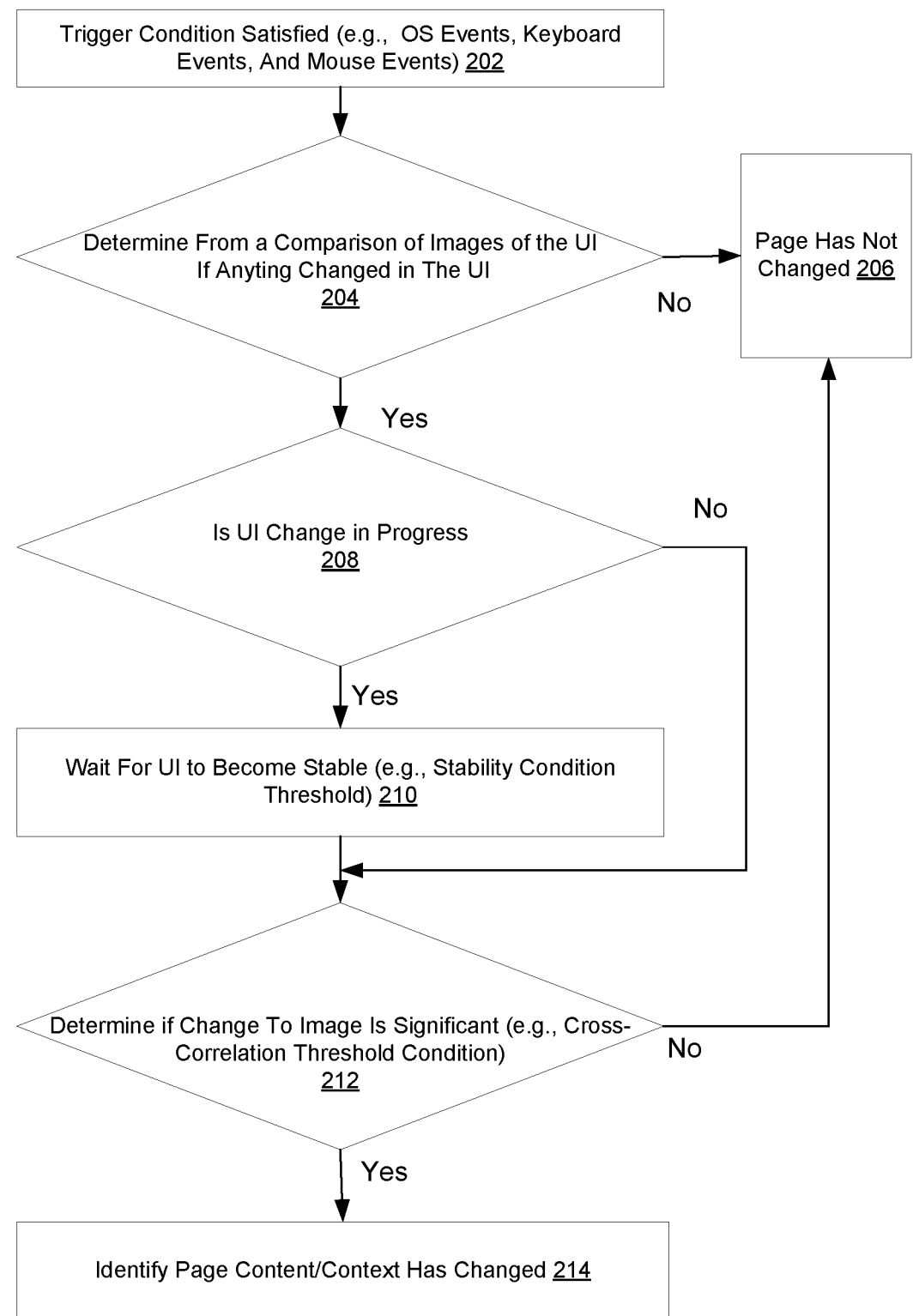
FIG. 2 is a high-level flowchart of a method to identify page changes of an application in accordance with an implementation.

FIG. 1 is a block diagram of a high-level implementation of an example of system for context/page detection for a digital adoption platform 102. The digital adoption platform 102 provides guidance for a target client application 101, which may, for example, be displayed on a display screen of a desktop computer 100. A target client application 101 running on the desktop of a client computer 100 generates a graphical user interface (GUI) 102 that may be displayed on a computer display screen of the client computer 100. The target client application may, for example, generate different application display screens (e.g., a calendar screen, a teleconference screen, etc.). Each of the application screens corresponds to a page of the application. Accurately identifying a page change/context change of the application that is being displayed on the user's computer display screen is important to provide the correct DAP guidance.

In an exemplary implementation, a digital adoption platform (DAP) 102 requires page change information to generate smart tips from content providers. The DAP is an additional software layer to provide help tips for the target client application.

In one implementation, the DAP 102 includes a DAP player process engine 104 to implement a player process; a Web process manager 106 to implement a Web process; a native system process engine 108 to implement a native process; and a guided assistance process engine 110 to implement a guided assistance process.

In one implementation, a page/context change detection engine 120 is provided. In one implementation, it includes a screenshot capture unit 122 to capture screenshots of screen images (or subsections thereof). In one implementation, a screenshot of an image may be resized and converted into grayscale for further analysis regarding changes to a displayed page. A trigger condition may be used to determine when an initial screenshot is captured. A configurable time may be selected for each consecutive subsequent screen capture, with 300 milliseconds being an exemplary time interval between consecutive screenshots.

In one implementation, a screen stability unit 124 determines screen stability by using a stability score based on comparing a sequence of screenshots. For example, if a screen UI page is still loading, it's not yet stable. For example, if it takes about 2 seconds for a screen UI page to load, and if the interval between screenshots is 300 milliseconds, then a number of screenshots will be captured before the UI page has finished loading. In one implementation, a cross-correlation technique is used to evaluate screen stability.

In one implementation, a screen similarity engine 126 analyzes differences between screenshots, or in some implementations, subsections thereof. In one implementation, a cross-correlation technique is used and cross-correlation thresholds are used to identify a page/context change. In one implementation, the difference between images is measured using a cross-correlation technique that has a score between $-1$ and $1$, where $-1$ denotes a complete change and $1$ denotes no change at all.

For example, a cross correlation technique close to 1, such as a cross correlation reference value of 0.95, may be used to identify when images are stable. In particular, when a page has finished loading (or is nearly finished loading), then two consecutive screen images taken when the page loading is nearly complete will have almost no change, and hence the cross-correlation value will be close to 1.

However, a lower cross-correlation value between two images, is useful to identify when there is a page change where one of the images is a reference screenshot image taken prior to the page change (e.g., a screenshot taken when a trigger condition is satisfied). For example, a cross-correlation threshold value of 0.80 to 0.90 in comparison to an initial reference image may be used to detect a page change.

In one implementation, a threshold value of the cross-correlation computation of around 0.8-0.95 is used to define a context change for an application. Cross-correlation scores below this threshold indicate that there is a context change compared to the previous state of an application prior to a trigger condition being satisfied. This is an empirically derived range of threshold values, which may be adjusted for a particular application. This is because for some applications, the application's UI and colors are mostly similar for each page (or for many pages) but may differ slightly in data format or presentation. For a particular application, the cross-correlation coefficient threshold for each page/context change may be logged under the file and could be analyzed through it. In one implementation, a cross correlation threshold value is an incremental change (a delta change value) relative to an average value.

Performing cross-correlation calculations on grayscale screenshots is computationally less intensive than for colored images, which is a consideration given that some end users may have low end computer devices. It should be noted that better correlation score accuracy can be achieved on color images. It will be understood that the process may be configurable or otherwise be adapted to the capabilities of a user's client computer. For higher end computing devices, the cross-correlation scores may be calculated from color images. However, the process may calculate cross-correlation scores for grayscale images for low end client devices. In some implementation, calculating cross-correlation scores on grayscale images may be the default setting.

In some instances, a significant portion of a screen may be either blank or otherwise have very little content that reflects a difference in a screen in a cross-correlation computation. For some cases, a significant percentage of the UI screen may be sparse or blank in terms of changeable content. In some implementations, dividing the screen image into subsections may be used to reduce computational effort and improve the accuracy of cross-correlation computations. For example, a screen image may be divided into two or more subsections, with a division of a screen image into four quarters (quadrants) being one example of this. Rules may be defined for a particular application to identify conditions for dividing the screen image into subsections is performed. As an illustrative example, consider sectioning a screenshot into quarters (i.e., four quadrants of equal area). However, the technique may be generalized to include dividing a screen image into two or more subsections. A screen subsection engine 128 is included in one implementation to divide a screen into smaller sub-sections (e.g., by rectangular quarter sections as one example).

In one implementation, a subsection pre-processing unit may identify empty (or comparatively empty) portions of a UI screen. This may, in some implementations, be based on image pre-processing to identify what portions of a displayed page are blank or that are otherwise irrelevant for analyzing differences in images.

This section pre-processing can be implemented in an application agnostic manner. However, if additional application information is available, this could also be considered. For example, if additional information is available on how a particular application lays out content that might also be considered. For example, some applications are more likely to have blank sections in particular sections of a page (e.g., top vs. bottom of page; left vs. right section of page).

In one implementation, a subsection rules module 132 is provided to implement rules to determine when to divide a screen into smaller subsections, and rules to process subsections. For example, a UI screen may be sectioned into two or more subsections (e.g., two, three, four, six, eight, etc.). The subsections may also be oriented/arranged differently (e.g., vertical strip segments vs. horizontal strip segments as one possibility; or a grid array such as a 2×2 into quarter sections or a 3×3 array into 9 sections as another example). While the sub-sections may be of equal size, more generally they may be of different size. For example, some applications may have pages with an uneven distribution of content in the sense that the blank sections are not symmetrically distributed. For example, some pages may have more of the content near the top or the bottom of the page; or more of the content located on the right or the left side of the page.

An order for processing subsections and performing cross-correlation computations on analogous subsections may also be defined. For example, if a screen image is divided into four quadrants Q1, Q2, Q3, and Q4, the cross-correlation computations may be performed on in analogous quadrants. For example, if all subsections but one is blank, then only the one non-blank subsection needs to be used in an image comparison. For example, if the division is into quadrants, and only one quadrant had content, then the cross-correlation may be limited to that one quarter of the image.

In one implementation, an event trigger engine 134 identifies conditions for triggering computationally expensive image process calculations for identifying page changes. The trigger conditions may include, for example, keyboard events, mouse events and operating system events that are indictive of a likely upcoming page change. For a particular operating system, a table may be defined of a combination of OS events, keyboard events, and mouse events. An optimal sequence of events may also be considered. For example, in one implementation, Keyboard and Mouse events are first detected before moving on to listening for focus and UI reorder events and then deciding to start an image difference algorithm check.

In one implementation, a screen pixel caching module 136 includes a cache (or access to a cache) and cache rules to cache screen pixels. For example, after a trigger condition is satisfied, an initial screenshot image (or a grayscale version thereof) may be cached and used during a page identification process that may include, for example, a series of comparisons with a series of consecutive screenshot images. Performing screen pixel caching in a page change identification process provides a variety of performance benefits. In one implementation, grayscale pixels are cached according to cache rules optimized for page change detection.

Retry logic 138 supports performing retries, such as during a time period when the screen UI is not stable. For example, a maximum number of retries (e.g., 3, 4, 5, or 6) may be supported. Alternatively, there may be a maximum time interval during which retries are permitted. In some implementations, the maximum number of retries is configurable.

An event listening module 140 may be provided to support the page/context change detection engine 120. For example, in one implementation, Operating System event listeners may listen for a Focus change, Keyboard event, Mouse Activities and System UI elements reorder events.

In one implementation, a configuration engine 142 is provided for a user or an administrator to adjust/select configurable parameters. This may include, by way of example, the number and arrangement of subsections and arrangements of subsection 144, one or more other subsection rules 146, retry parameters 148, cross-correlation thresholds 150, and may also include other parameters, such as a timeout value.

One aspect of the technique for identifying page/context change detection is that because it relies on analyzing a difference in images it is platform and application technology independent for desktop applications. Desktop applications are typically built using technologies like .Net Framework, SAP GUI, JAVA etc. Using an image difference-based algorithm is platform and application technology independent because detecting differences between images is not tied to title change event, a foreground change event, or a specific element on the page. This solution is independent of the application technology on which it is built in and can work on a wide variety of different desktop applications it Automation, SAP GUI, JAVA, Citrix or Remote desktop compliant because they use system events and because capturing screen shots and performing image processing of captured screenshot images is technology agnostic.

In one implementation, when a trigger condition is satisfied, an initial screen shot image is captured, which is followed by one or more additional screen shot images taken slightly later in time, where, for example, the time interval between consecutive screenshots may be selected to be any reasonable number, such as 300 milliseconds, as an illustrative but non-limiting example. The time interval between consecutive screen shots may, for example, be based on an empirical understanding of possible minimal time periods after the trigger condition is satisfied for a page change to occur. There is thus an initial screen shot that is captured along with at least one subsequent screenshot image that is captured. If a page change occurs, there will be a difference in screenshot images that can be determined based on whether the cross-correlation value is less than a first threshold value.

In one implementation, a stability analysis is performed based on analyzing the cross-correlation value of later screenshots, relative to a second threshold value. The stability analysis may be used to determine that screen image is stable (e.g., the page is loaded or nearly loaded). This provides a number of benefits, including supporting providing DAP guidance when a page is stably loaded.

As previously discussed, in one implementation, differences between successive images are calculated using a cross correlation coefficient. A cross correlation threshold value is used to decide if there is a change in the page. As some examples, a threshold value of 0.8 to 0.85 may be used, although more generally a wider range of 0.7 to 0.9 might by possible in some implementations. In one implementation, the threshold value is configurable in the range of 0.5 to 1.0 to provide flexibility in configuring the page change detection process. For example, if there is a default range of threshold values in the default range 0.7 to 0.9, the threshold value may be configurable to improve the accuracy of deciding if there is a change in a page. A default threshold value of 0.8 to 0/85 is arrived at through multiple experiments. These cross-correlation threshold values are in an approach in which the cross-correlation values are in the range between –1.0 (negative 1.0) to 1.0 (Positive 1).

The cross-correlation threshold value can be adjusted, if necessary, based on empirical results for particular types of applications, which may vary to the degree different pages change in content. The trigger events may be selected to include operating system events that are found in common operating systems and can, if necessary, be adjusted to account for minor differences in operating system events between different operating systems.

In one implementation, the trigger for starting the process of a page change identification algorithm utilizes a combination of OS events Focus change, UI reorder events, keyboard events and mouse click events.

In one implementation, a listener is used for a set of OS events such as focus change and UI reorder events. Reorder or Focus events come up whenever there is a change in UI. It was observed that this event is received even if the mouse is moved on the screen of the target application (for e.g., SAP), because it usually displays certain text elements on the screen at that point. Ordinarily, to switch between pages, mouse clicks or keyboard keys (Enter, Tab, Esc) are pressed by a user. Therefore, in one implementation, the trigger conditions include mouse events (e.g., mouse up) and a few keyboard events combined with reorder and focus events. In one implementation, there is a sequence in which a reorder/focus event is only considered if a mouse/keyboard event was received earlier. Thus, the trigger condition(s) identify when a page change is likely to occur. Once the combination of trigger events is received, image processing starts, A difference in images is used to identify a page change. The identified page change, in turn, is eventually used to segment digital guidance content. That is, the page change is used to aid in determining the DAP guidance provided to an end user (e.g., providing DAP guidance based on their individual preferences or needs).

FIG. 2 is a high-level flowchart of a method of page/context change detection in accordance with an implementation. In block 202, a determination is made if a trigger condition is satisfied based on a combination of events. In block 204, an initial comparison of screenshot images may be performed in decision block 204 to determine if an image difference exists. If there is no difference, a page has not changed (block 206). If there is a difference, a determination is made in decision block 208 if a change to the UI is in process. If not, then the process moves to decision block 212. If yes, the process moves to block 210 to wait for the UI to become stable (e.g., satisfying a stability condition threshold). In block 212 a decision is made whether the change in the screenshot image is significant, which may be based on a cross-correlation similarity threshold condition. If not, then the process moves to block 206. If yes, in block 214 the process identifies that that page/context has changed.

FIG. 3A illustrates an example of a table for determining a combination of events that triggers the computationally expensive image processing aspects of the page/context change detection process. In some implementations, for the Windows operating system, this includes a combination of focus events, UI reorder events, keyboard events, and mouse events. However, more generally, other combinations of events could in theory be utilized that are indicative of a likely page change. To the extent that there are minor differences in the events (or event names) in different operating systems, the trigger conditions could be adapted for different operating systems. Thus, it will be understood that the basic technique may be applied to different operating systems, including Windows, MAC, Linux operating systems, etc. It will also be understood that the trigger conditions can be varied from those illustrated.

In one implementation, the event listener listens for different OS events such as UI focus change and UI reorder events and when these events occur at a certain predefined combination as described in the table of FIG. 3A, the page change identification process is initiated for checking the difference between consecutive screenshots of the application to identify a context/page change.

Reorder or Focus events come up whenever there is a change in UI. It was observed this event is received, even if a user moves a mouse on the screen of the target application (for e.g., SAP), because it usually displays certain text elements on the screen at that point. However, greater reliability, in terms of a trigger condition, is achieved by considering a combination of focus or reorder events and mouse events and keyboard events. This is because ordinarily to switch between pages, mouse clicks or keyboard keys (e.g., Enter, Tab, Esc) are pressed by a user. Therefore, better trigger results are achieved by combining mouse events (e.g., mouse up) and a few keyboard events with reorder and focus events. In one implementation, reorder/focus events are listened to only if a mouse/keyboard event was received earlier.

Once a combination of trigger events is received, image processing is initiated to determine if there is a difference in images. FIG. 3B illustrates an example of a cross-correlation formula. However, more generally the cross-correlation performed between screenshot images (or sections thereof) other well-known cross-correlation equations and optimizations thereof known in the art.

Figure 4:
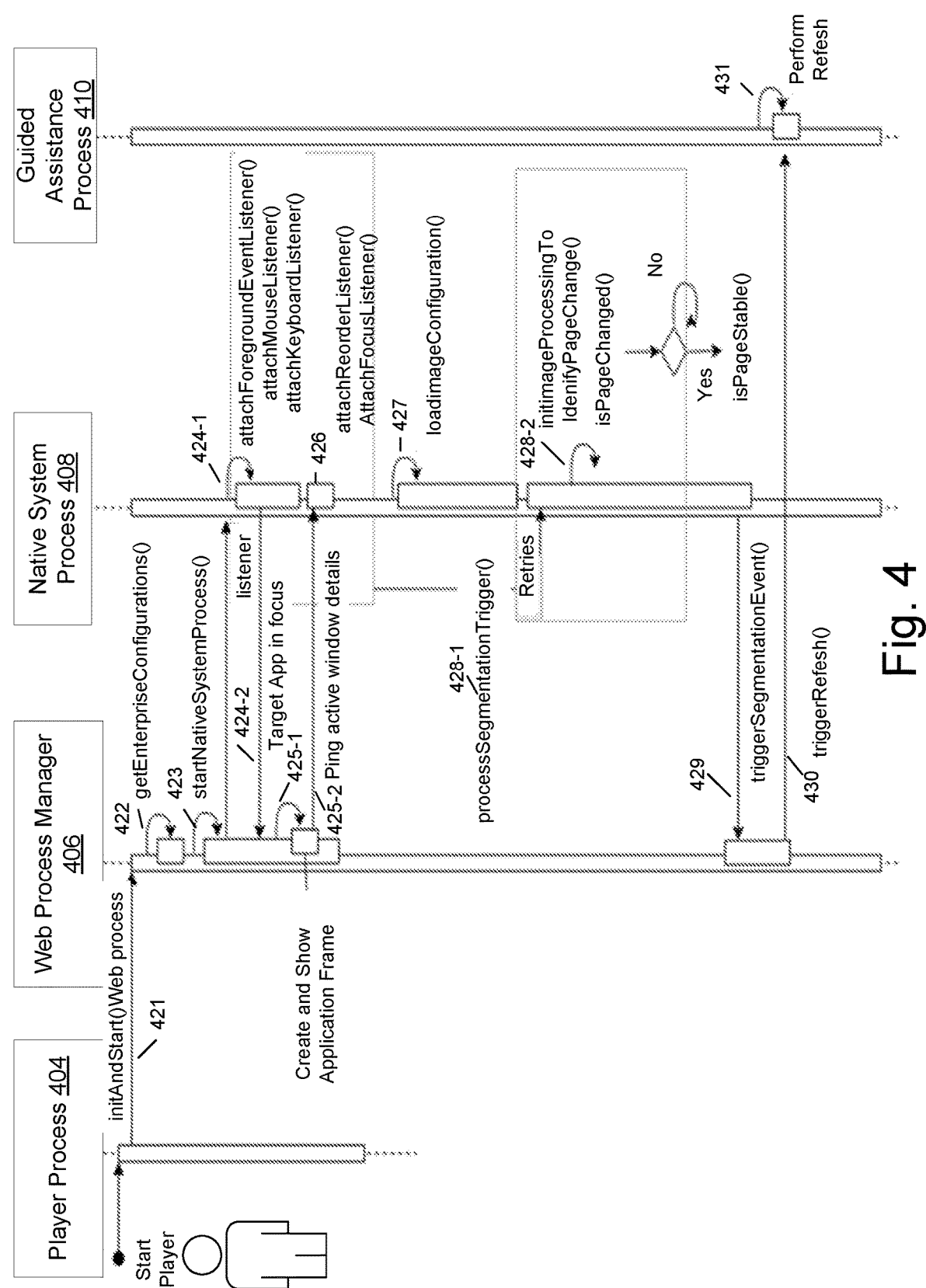
FIG. 4 is an interaction diagram illustrating a process of page identification in accordance with an implementation.

FIG. 4 illustrates a process for illustrating the interaction of four systems corresponding to a Player Process 404, Web Process Manager 406, Native System Process 408, and Guided Assistance Process 410 in accordance with an implementation. Each system has its own set of core responsibilities. The page/context change detection process may be coordinated across the four systems to identify a page/context change.

In one implementation, the Player Process 404 is started by the end user. This is the entry point to start the DAP platform on the user's machine (e.g., on a desktop computer operating a target client application for which DAP assistance is to be provided).

In one implementation, a Web Process Manager 406 holds multiple responsibilities. In one implementation, it retrieves configuration details for an enterprise. In one implementation, it starts the Native System process 408. In one implementation, it forms the layer to overlay the DAP product's widgets on a target client application. In one implementation, it helps in communicating between the Native System process 408 and the Guided Assistance process 410.

In one implementation, a Native System Process 408 is responsible for interacting with target applications and listening to OS events triggered by the application. In one implementation, it identifies if the application's context has changed or not, deciding further whether to trigger segmentation or not.

In one implementation, the Guided Assistance Process 410 receives the message to trigger segmentation and performs the refresh.

In one implementation, as illustrated by arrow 421, the Player Process 404 loads any stored local information and starts the Web process Manager 406.

In one implementation, as illustrated by in arrow 422, the Web Process Manager 406 retrieves the Enterprise configuration details for the end user's account.

In one implementation, as illustrated by arrow 423, the Web Process manager 406 starts the Native System Process 408.

In one implementation, once the Native System Process 408 is started in arrow 423, it registers in arrow 424-1, the hooks for global events, which includes Foreground, Keyboard and Mouse events.

In one implementation, as illustrated by arrow 424-2, as soon as a target application comes into focus, the Native System Process 408 sends a message to the Web Process Manager 406 to alert it that the target app is in focus.

The Web process manager 406 listens to this message and creates an IFrame over the target application to overlay widgets as indicated b by arrows 425-1 and 425-2, which results in sending the target application's related configurations to the Native System Process 408.

In one implementation, the Native System Process 408 receives the target application's related configurations, as illustrated by arrow 426 it registers hooks for Reorder and Focus events that are application specific.

In one implementation, as illustrated by As illustrated by arrow 427, the Native System Process 408 loads the image configurations. The received configurations also hold the values that are required to perform Image processing (other than other configuration details), which are loaded on the Native System process 408. Some examples of parameters that are associated with Image processing include the following:

1) Coefficient Threshold: Helps to set an upper threshold for a cross-correlation threshold value to identify context change. An example of a default value is 0.80, although other values that are higher or lower could be selected, such as 0.50, 0.60, 0.70, 0.90, or 1.0.

2) Image Evaluation Retries: Identifies the number retries to be performed over an application for identification of a context change. This may vary depending on the type of application and depending on application's performance. An example for default retries is 6, although other number of retries could be selected such as 3, 4, or 5.

3) Enabled Segmentation Debug Mode: This is useful for engineers in debugging purposes. It allows saving the images on the machine, to identify and debug the process. In one implementation, by default, it will be disabled.

In some implementations, users have the flexibility to configure he values of the coefficient thresholds for identifying context change the number of retries, etc.

Once the associated image configuration is loaded, the process builds the initial cache image, which generates an initial image to compare with. This is necessary for the very first comparison to take place. In one implementation, as soon as the target application is in focus, a first screenshot it taken and it becomes a cache image.

In one implementation, since the events are already hooked, listeners are used to identify when to process segmentation triggers 428-1. As illustrated in arrow 428-2, steps to initiate image process to identify if a page is changed are initiated. If the correlation coefficient is less than the threshold value, the context is known to be changed. If not, the process performs retries, until they are exhausted, assuming the page is taking time to load. If all the retries are exhausted, in one implementation the process assumes that page has not changed. Once a process receives a page that has changed, further consecutive screenshots may be compared to identify if the page is stable. In one implementation, there is also a timeout value (e.g., 5 minutes but more generally a configurable time period such as 1 minute, 2 minutes etc.). If the timeout value is exceeded, a determination is made that the application is in a hung state, and evaluation is stopped (to prevent and not go into infinite computations). In one implementation if the cross-correlation coefficient value is greater than a threshold value, such as 0.95, the process considers a page to be stable. However, more generally other threshold cross-correlation coefficient values could be selected that would be consistent with the application being stable enough that there is little or no additional loading of content on the page.

Once the page is stable, this aids in confirming that the context has changed. If a page change is identified, then as illustrated by arrow 429, the Native System Process 408 sends a message to the Web Process Manager 406 to trigger segmentation (e.g., providing guidance to an end-user, may include providing guidance based on user preferences or user needs). In one implementation, as illustrated by arrow 430, the Guided Assistance Process 410 will perform a refresh to perform segmentation (e.g., provide DAP guidance to a user based on any applicable user preferences).

Figure 5A:
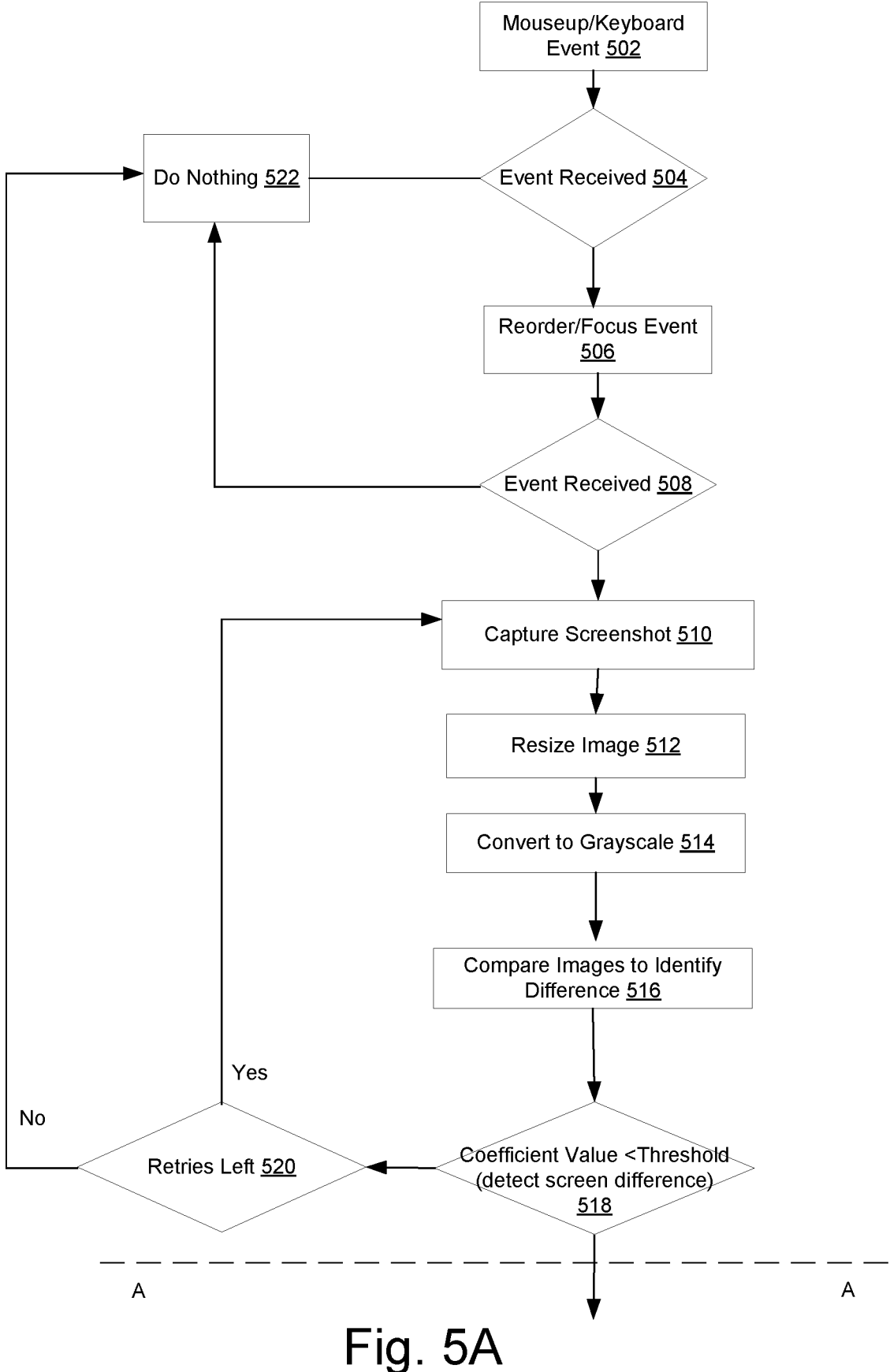
FIG. 5A is a flowchart of a method of performing page identification in accordance with an implementation.
Figure 5B:
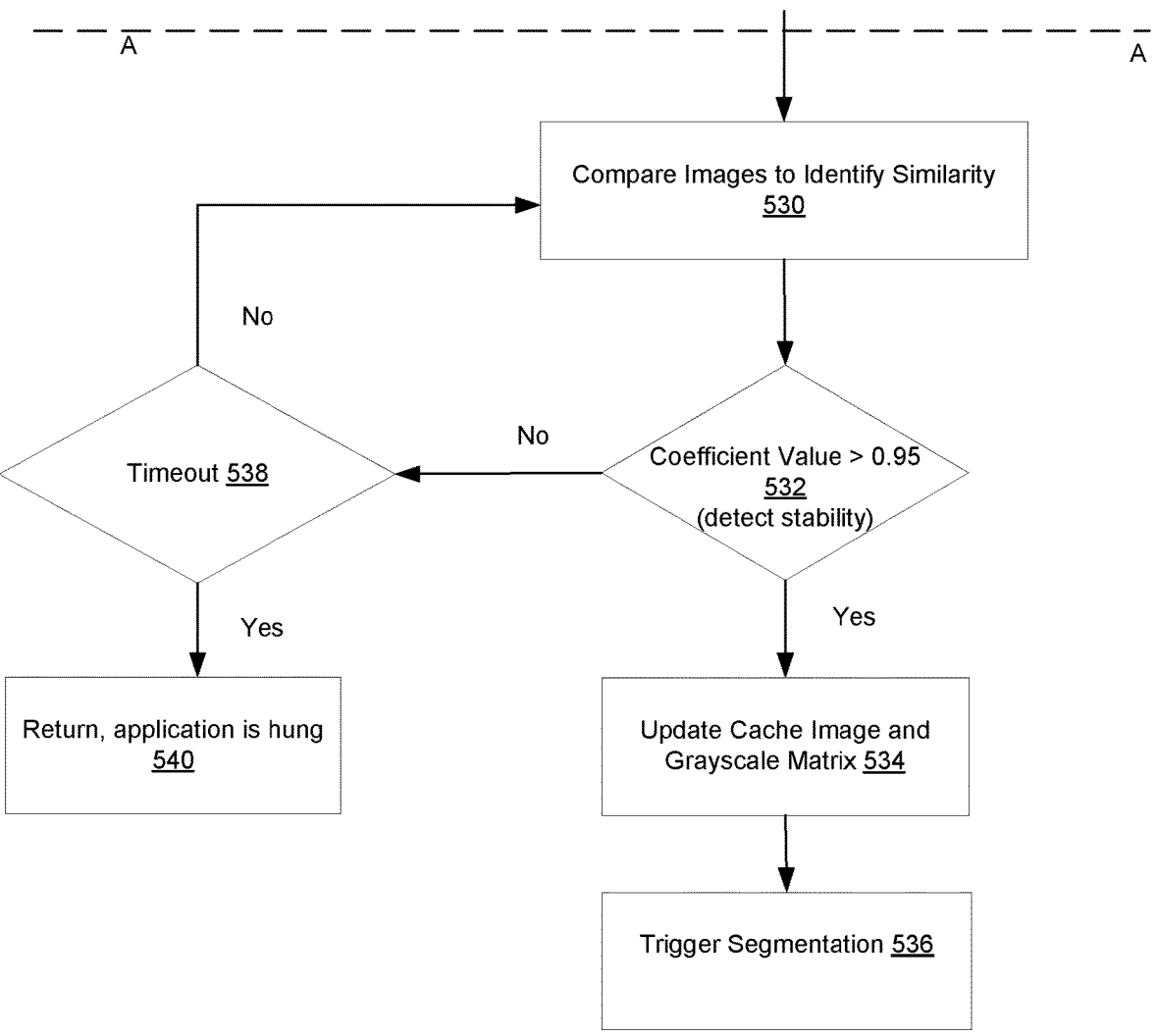
FIG. 5B is a continuation of the flowchart of FIG. 5A, from line A-A, in accordance with an implementation.

FIGS. 5A and 5B illustrate another example of a method in accordance with an implementation. Referring to FIG. 5A, the process in block 502 listens for Mouse/Keyboard Events. In block 504, the process checks for mouse/keyboard events. If no Mouse/Keyboard events are detected, the process moves to block 544 and does nothing. However, if a Mouse/Keyboard event is received, the process in block 406 keeps track of Reorder/Focus events.

In one implementation, if a Mouse/Keyboard event is detected but no reorder/focus events are further detected, the process moves to block 544 and does nothing. However, if a Mouse/Keyboard event is detected and a reorder/focus event is detected, the trigger condition for a combination of events is satisfied, and the process them moves on to perform image processing steps that are more computationally expensive.

In block 510, a screenshot is captured of the foreground window. In block 512, resizing of the image is performed. There is a possibility that the previous and current screenshot differ in size. So, to make sure the process does not process the wrong set of data, the current image is resized, if necessary, based on the previous image.

In block 514, the image is converted to grayscale, which reduces the number of variables to check in making an image comparison, which can also be described as reducing the number of dimensions for analysis. Reducing the number of variables improves speed, which aids in avoiding the problem of stale data while forming a comparison between images. Therefore, in one implementation an image is converted into a grayscale image and then further processing is performed on it.

In block 518, images are compared to identify differences between images. For the very first comparison, a screenshot is taken of the screen that appears first for the foreground window. Therefore, now the process has the data to compare. Both the images are in the form of grayscale, and a comparison is performed for the data for each pixel to get a cross-correlation coefficient.

If the cross-correlational coefficient is not less than a defined threshold, the process in block 522 determines if there are retries left to perform the same steps again. For example, a pre-selected maximum number of retries may be configured.

If all the retries are exhausted, the process will end and do nothing, moving on to block 544.

In block 520, if the cross-correlational coefficient value is less than a defined upper threshold, the process proceeds further to block 550.

The process continues in FIG. 5B at line A-A.

In one implementation, if the difference between two images is found, the process waits for the page to become stable (e.g., no longer loading elements). In one implementation, to figure out stability, in block 550, the process keeps on taking screenshots and compares them with the consecutive ones, to get a high correlation coefficient (e.g., greater than 0.95).

In decision block 552, if the cross-correlation coefficient is greater than 0.95, the page is considered to be stable. In block 554, the cache image and grayscale matrix are updated.

If not, the process performs the same steps until the process receives a timeout in decision block 558.

If the process reaches a timeout limit, this means that the application is hung and something is wrong. Therefore, the process ends in block 560.

After a page is stable, a determination can be made that the context has changed. The previous image, which is cache image, is updated with the current one. This will aid in subsequent comparisons to identify context change. Since the page context change is identified, segmentation is triggered in block 556, where the segmentation is part of the process of providing DAP guidance to a user.

As previously discussed, in one implementation the screenshot is divided into subsections, such as quadrants. Cross-correlation comparisons may be performed on specific subsections of the screenshot. This implementation is particularly beneficial for the case that a large portion of a screenshot is blank. In performing an image difference algorithm, the screenshot of the application is taken and compared with the cached image which was taken at the trigger point of the algorithm as described in the previous section. The image comparison happens in the following ways:

1) Full image comparison in which the process compares the full screenshot of the application with the previous and the next screenshots.

2) Sectional image comparison in which the image is divided into subsections and then each subsection is compared with the exact same subsection in the next image. For example, if the screenshot is divided into four quadrants Q1, Q2, Q3, and Q4, then quadrant Q1 in a first image is compared with quadrant Q1 in a second image, and so on. Dividing a screenshot into subsections may be necessary to achieve a high degree of accuracy in the page change identification when the application is maximized. This is because maximizing an application increases the likelihood a page has less content to show and that most of the area is blank. In theory each and every subsection could be evaluated. However, in some implementations, the sectional image comparison includes performing a pre-processing operation to identify regions of the full image that are blank or otherwise irrelevant. Alternatively, a pre-processing operation could identify potential opportunities to improve the accuracy of cross-correlation computations as a pre-condition to dividing an image into sectioning. In any case, once a single subsection is demonstrated by cross-correlation computation to indicate a page change, the other subsections do not need to be evaluated.

3) Additionally, another possible option would be to perform a full image comparison and then do a sectional image comparison for greater accuracy. For example, if the full image comparison generated a cross-correlation value that was marginal, in regard to having a cross correlation value indicative of a context change, an additional sectional image comparison could be done. That is, a sectional image comparison could be performed when one or more factors suggests a risk of a false negative result of the full image cross-correlation computation.

When a page has a large percentage of blank regions this increases the likelihood of false negatives when a cross-correlation function is computing. Dividing the image into subsections improves accuracy for the cross-correlation computations, particularly under some scenarios, such as when the application is maximized or if the application itself includes pages that are largely blank. This way, the process can accurately identify changes even if there are too many white spaced regions in the page as a whole.

Note that a page change has to be only detected in one subsection (e.g., one quarter).

Figure 6:
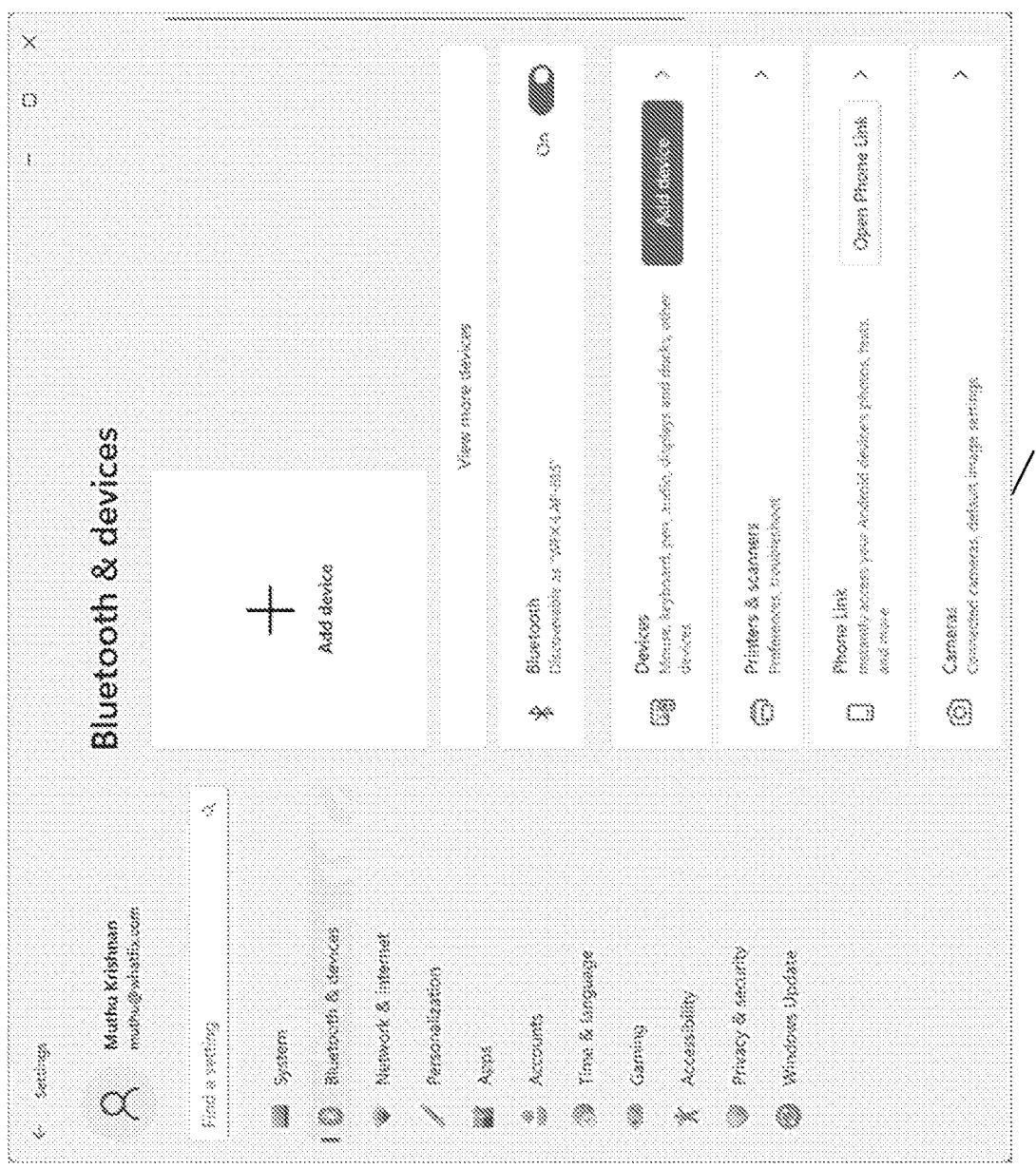
FIG. 6 illustrates a first example of an application context, showing an example user interface in accordance with an implementation.

Some aspects of cross-correlation and subsections will now be illustrated with some example UI pages. FIG. 6 illustrates a first example of an application context, in which a screenshot 610 of a UI page for Bluetooth & devices.

Figure 7:
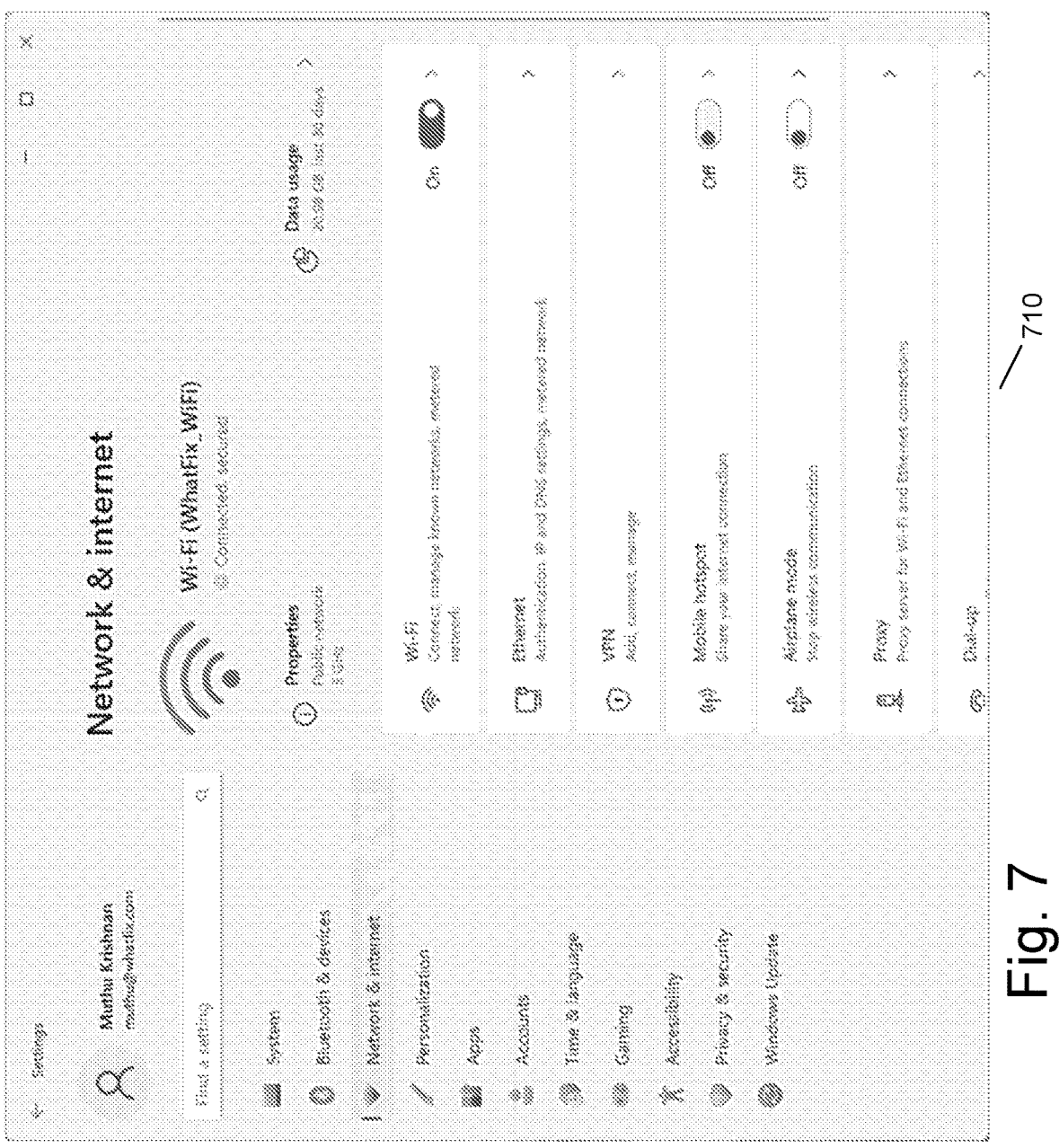
FIG. 7 illustrates a second example of an application context, showing an example user interface in accordance with an implementation.

FIG. 7 illustrates a second example of an application context, in which a screenshot 710 is of a UI page.

Figure 8:
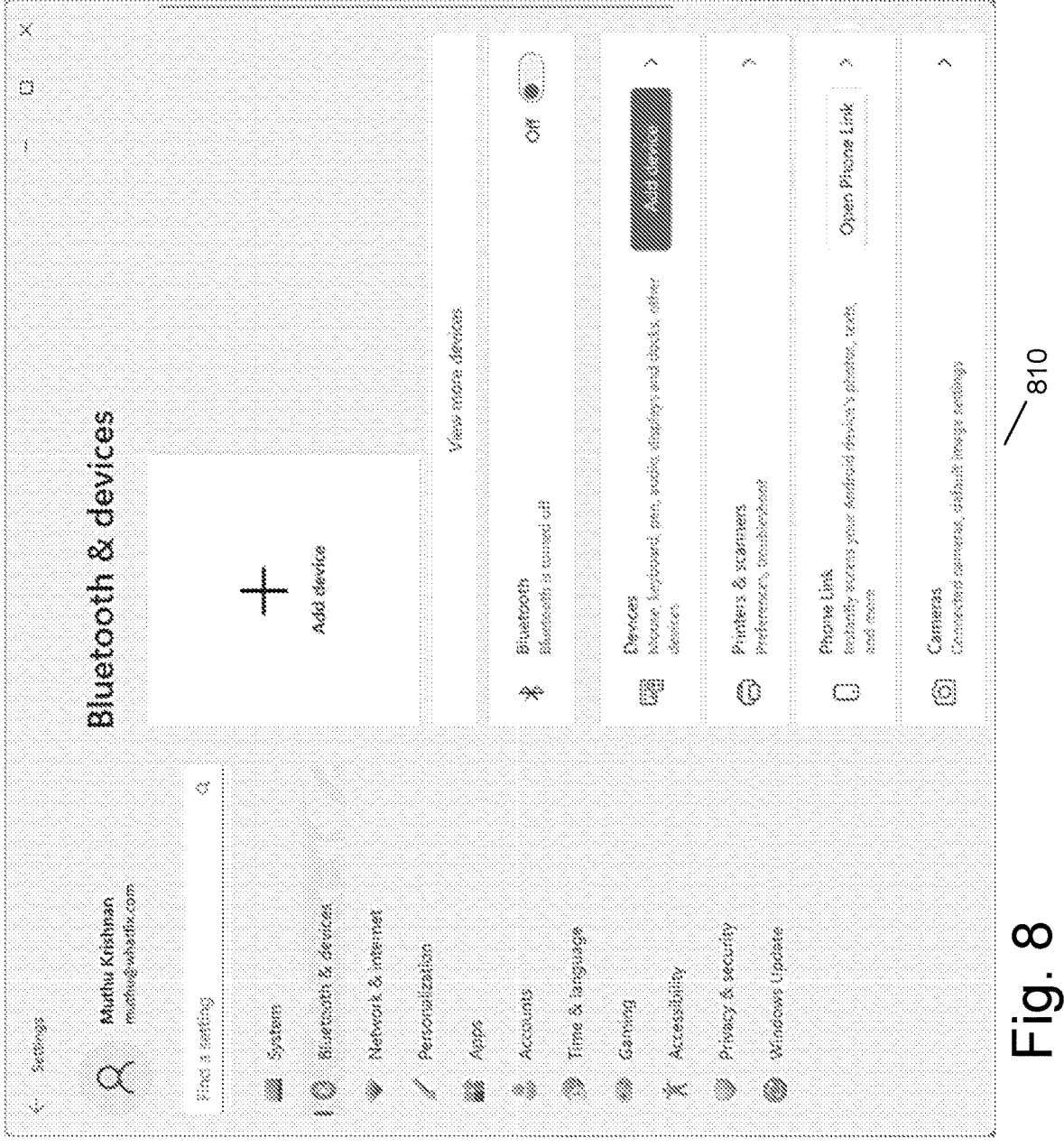
FIG. 8 illustrates a third example of an application context, showing an example user interface in accordance with an implementation.

FIG. 8 illustrates a third example of an application context, in which a screenshot 810 is of a UI page.

Figure 9:
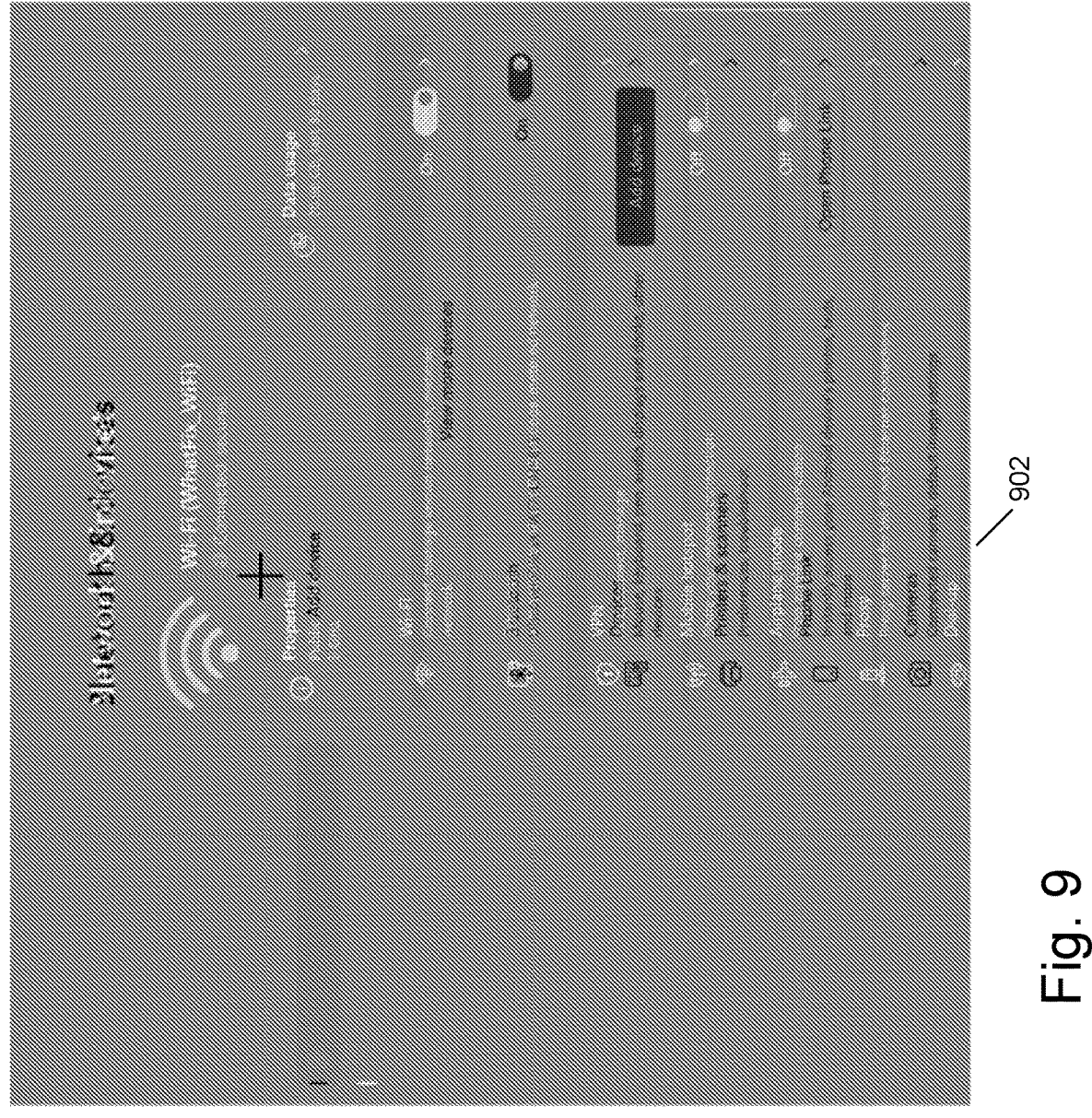
FIG. 9 illustrates a visualization of the difference between UI pages in the first context of FIG. 6 and the second context of FIG. 7.

FIG. 9 is a visualization of differences 905 between the pages in the first context of FIG. 6 and the second context of FIG. 7 to indicate visually aspects of performing a cross-correlation comparison. As the left-side of each page is nearly identical, there is almost no difference in that section of the screenshot. However, there is still substantial change between FIG. 6 and FIG. 7.

Figure 10:
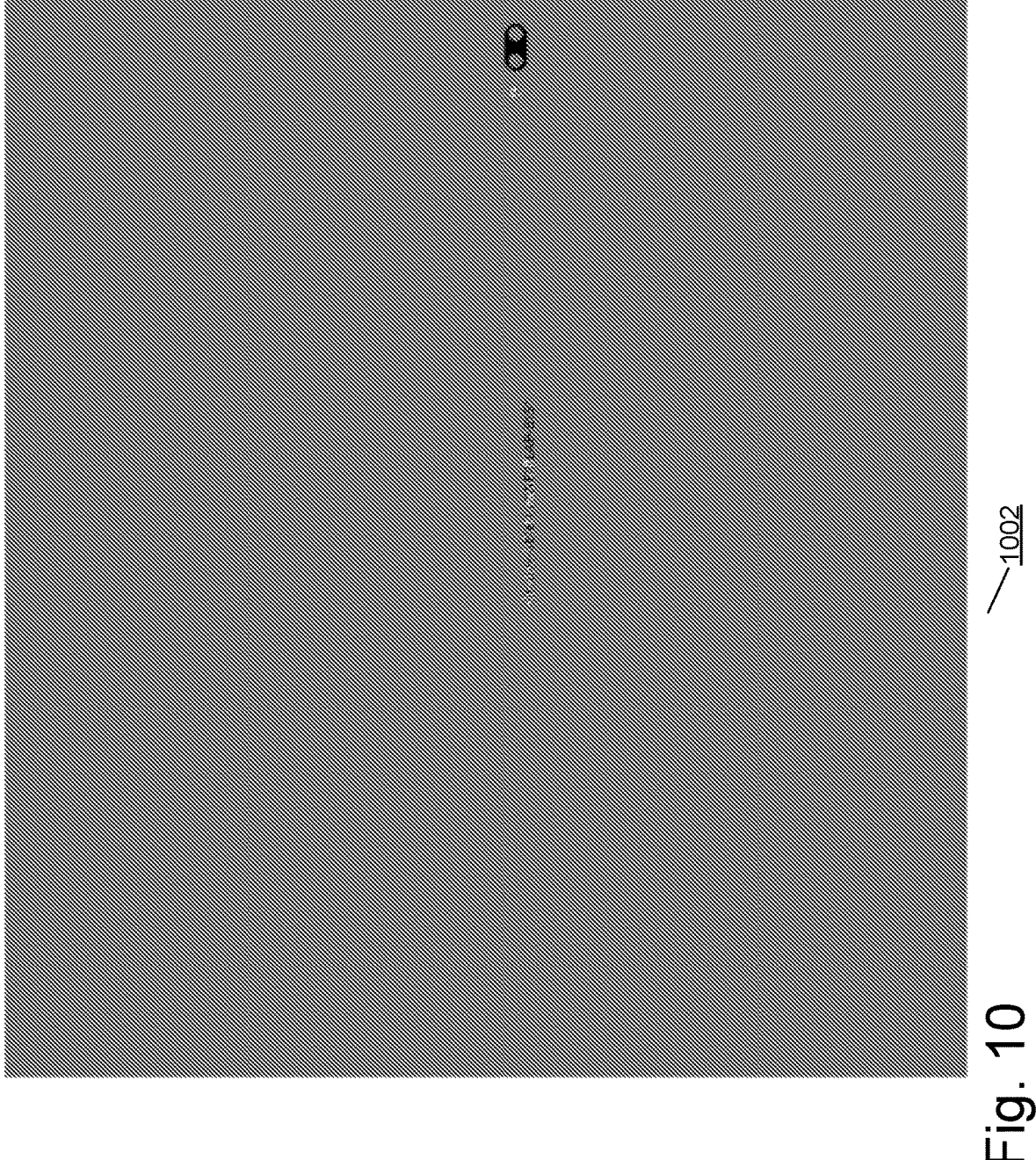
FIG. 10 illustrates a visualization of the difference between UI pages in the first context of FIG. 6 and the third context of FIG. 8.

FIG. 10 is a visualization of differences 1002 between the pages in the first context of FIG. 6 and the third context of FIG. 8. FIG. 6 and FIG. 8 are nearly identical. As such, only a small portion of the screen differs. One aspect illustrated by FIG. 10 is that the cross-correlation threshold may be selected to identify differences in pages that approximate the smallest difference that the typical human user would be aware of. As seen in the figures, the blank area is in the majority. While comparing images, the cross-correlation output can give a false negative when there is a large fraction of blank area in an image. So, dividing the image into multiple quadrants isolates the difference computation. Once a page change has been identified in one subsection (e.g., one quarter), there is no need to perform a comparison analysis on the remaining subsections.

Figure 11:
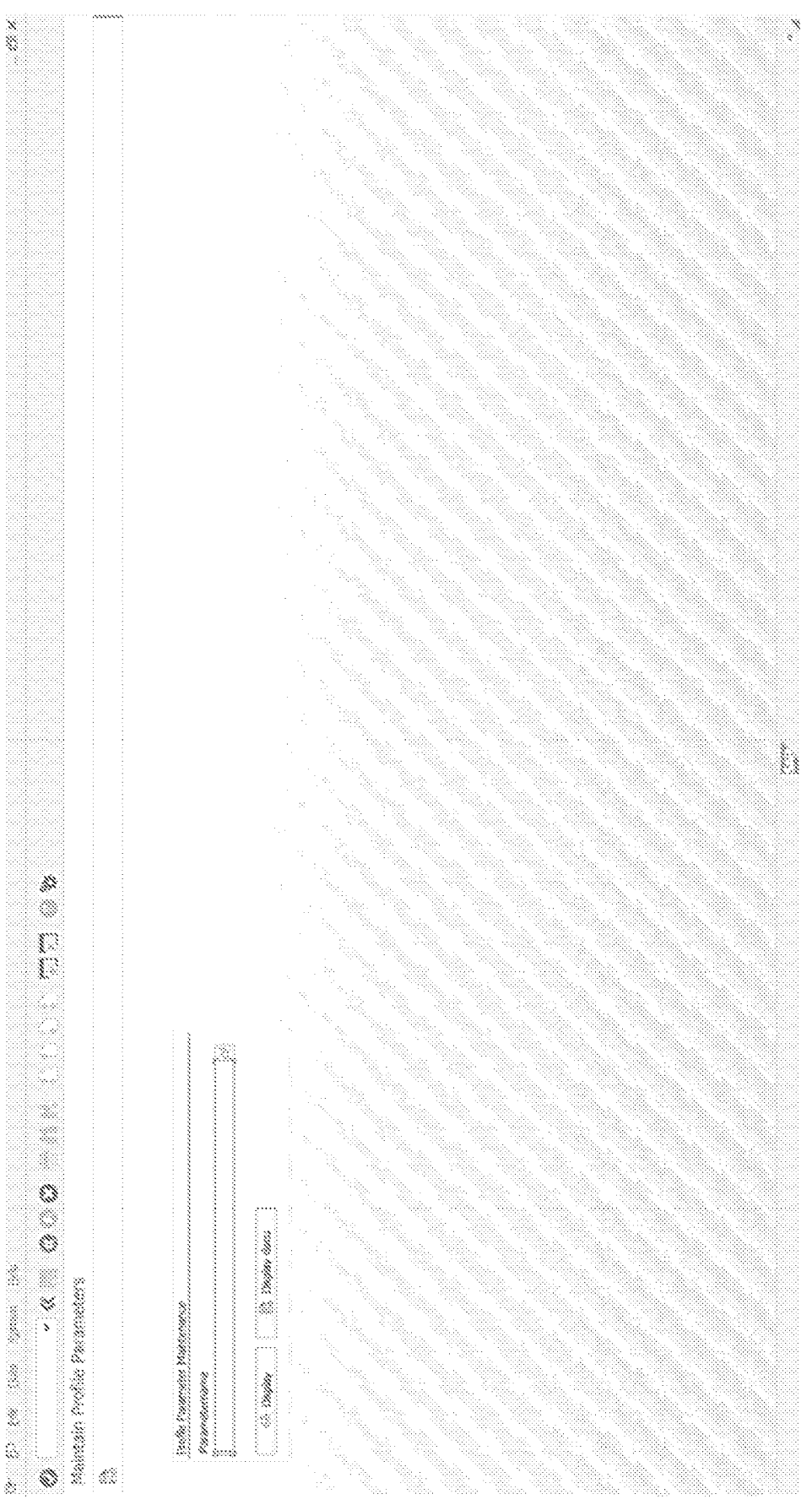
FIG. 11 illustrates an example of a UI page in which the blank area is a majority.
Figure 12A:
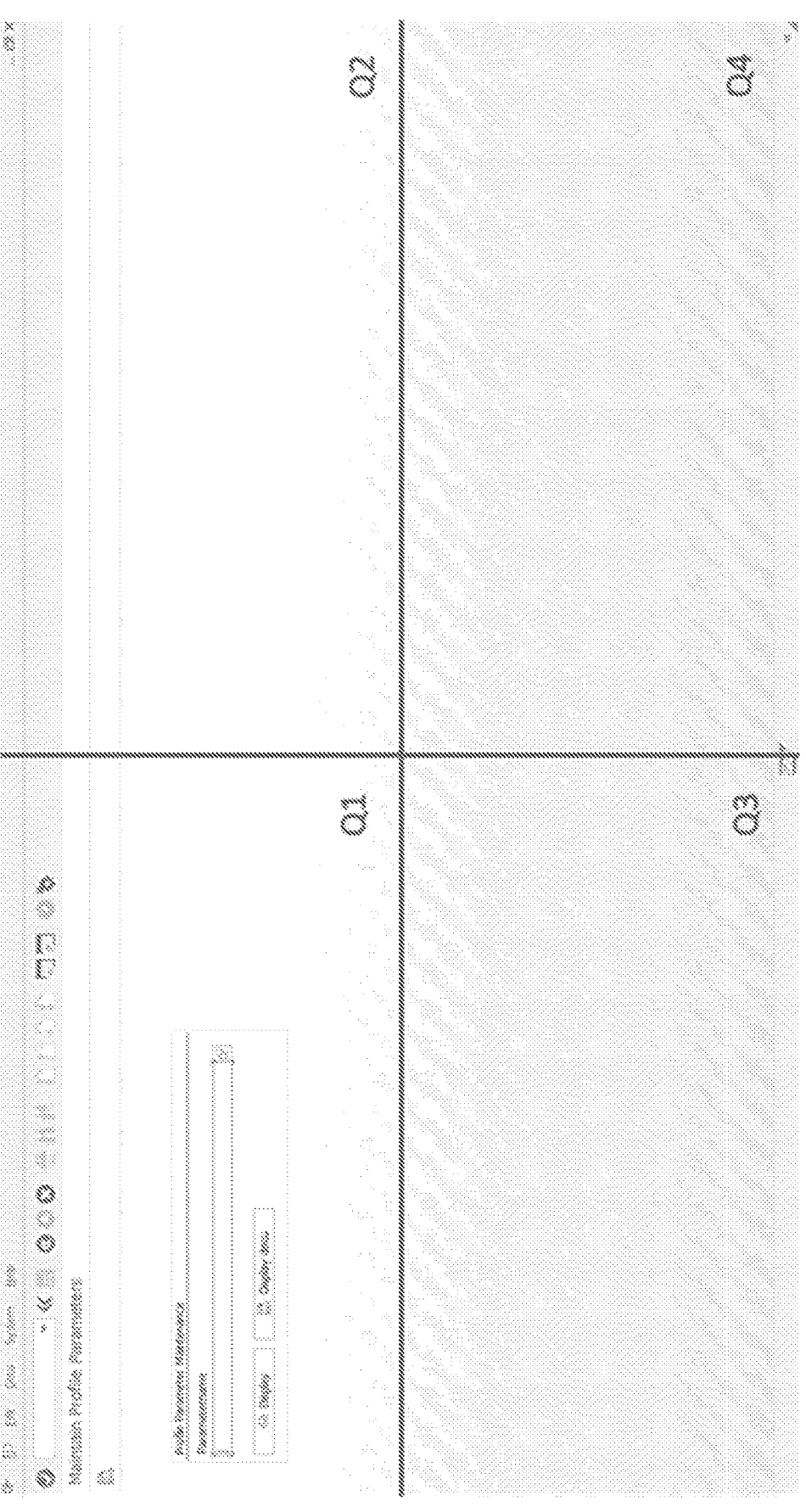
FIG. 12A illustrates an example of segmentation of the UI page of FIG. 11 into quadrants to aid in comparing images in accordance with an implementation.
Figure 12B:
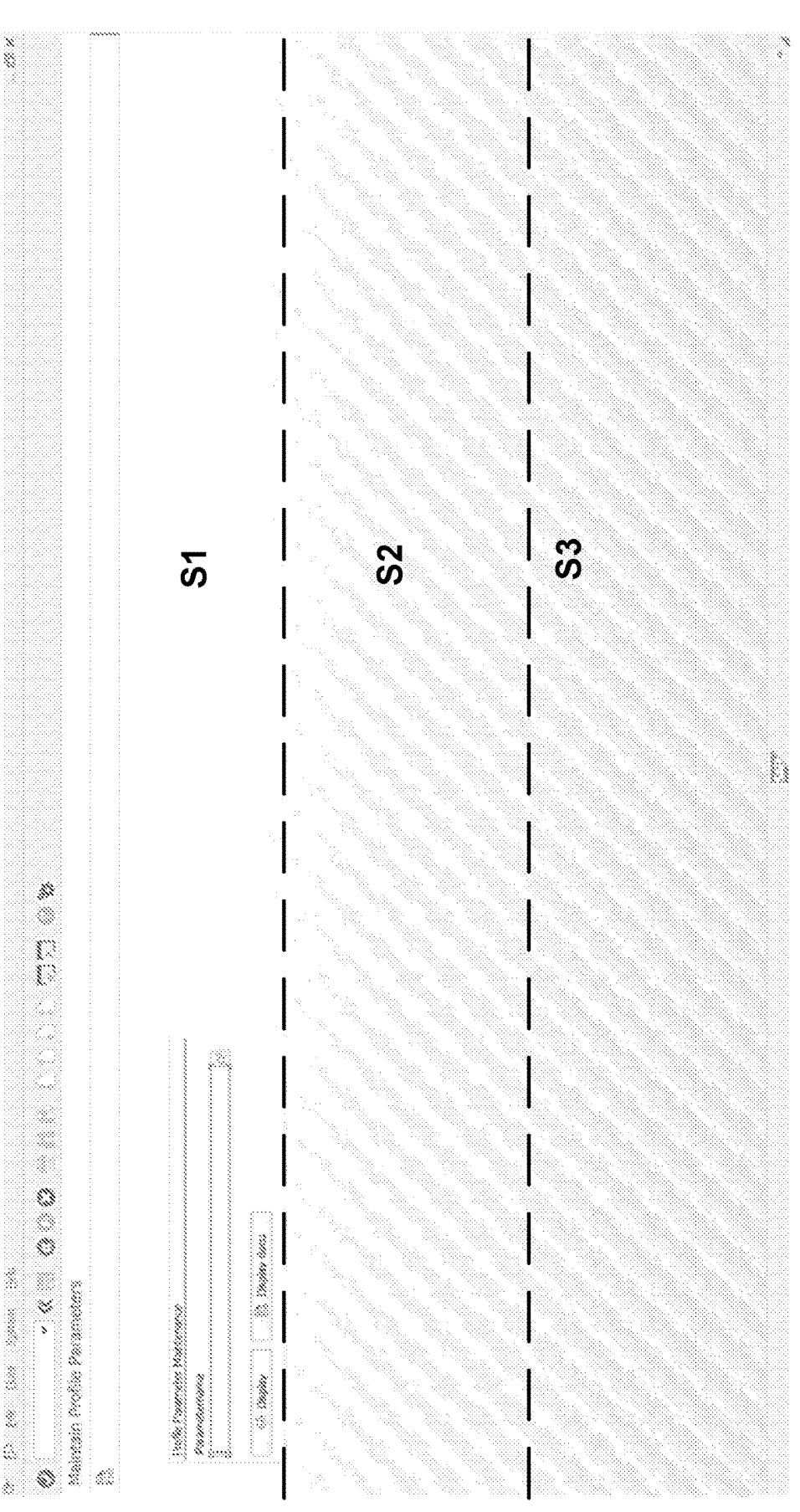
FIG. 12B illustrates an example of segmentation of the UI page of FIG. 11 into three segments to aid in comparing images in accordance with an implementation.
Figure 12C:
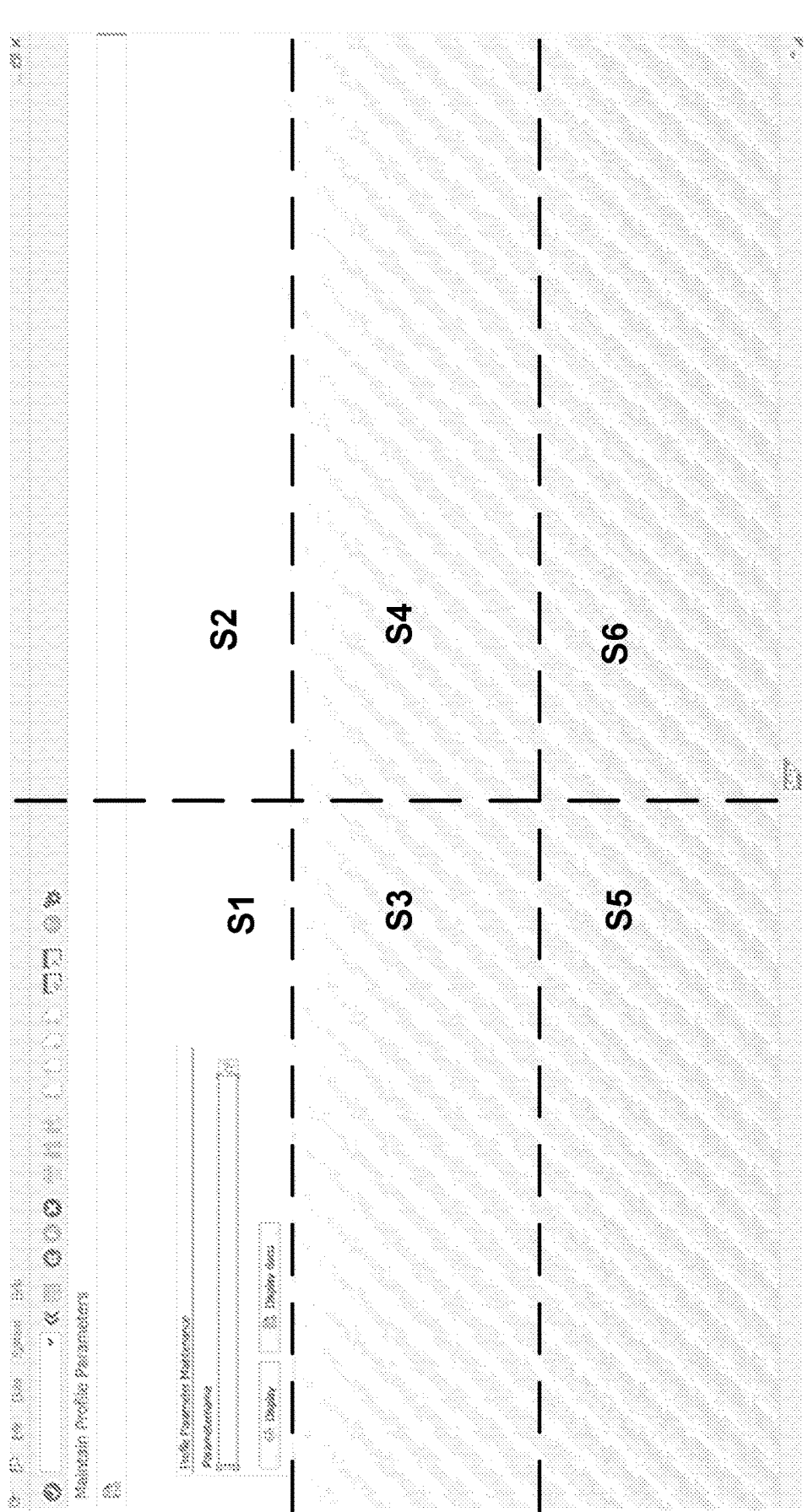
FIG. 12C illustrates an example of segmentation of the UI page of FIG. 11 into six segments to aid in comparing images in accordance with an implementation.
Figure 12D:
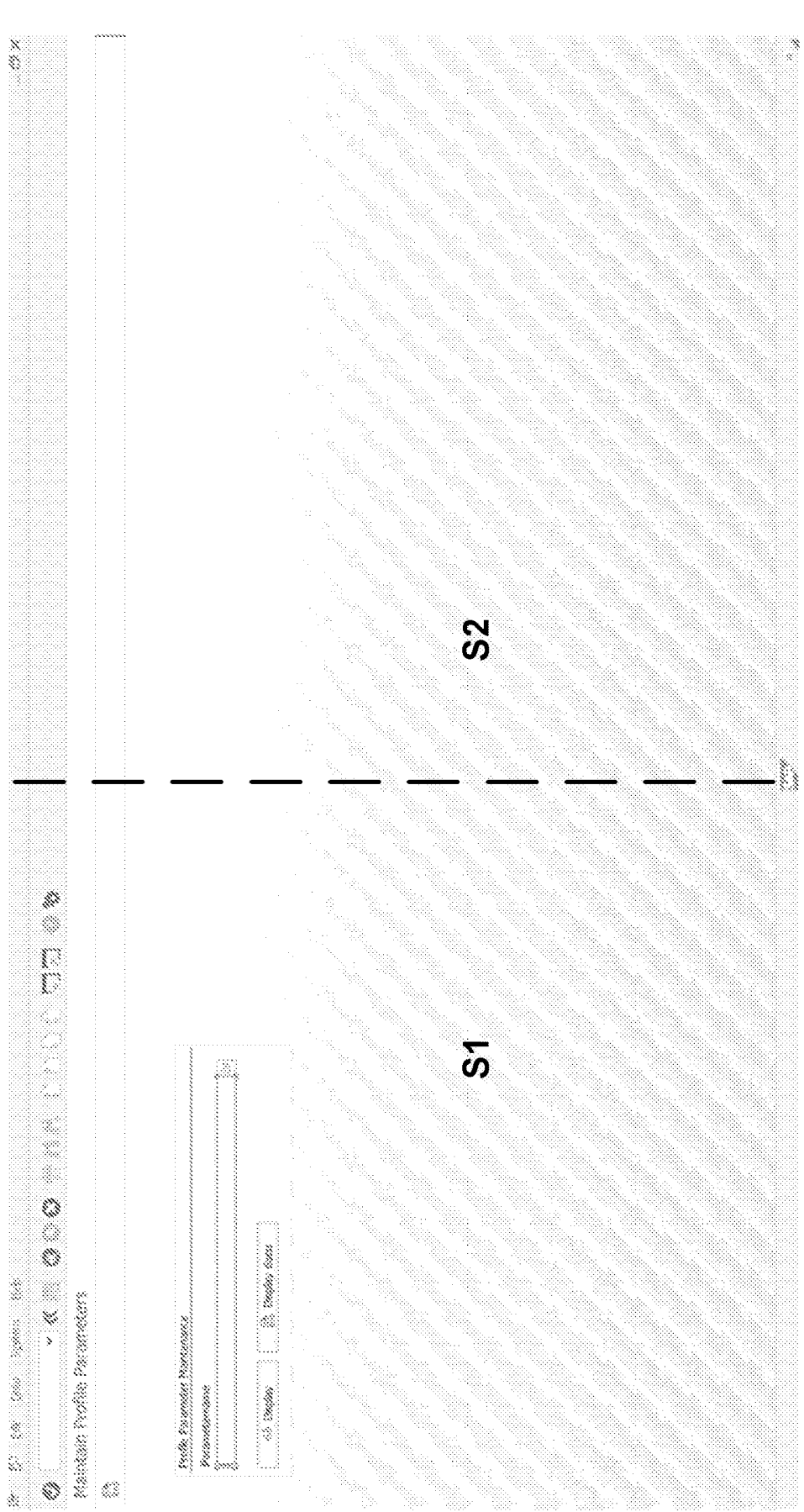
FIG. 12D illustrates an example of segmentation of the UI page of FIG. 11 into two segments to aid in comparing images in accordance with an implementation.

FIG. 11 illustrates an example of screenshot of a UI page in which the blank area is in the majority. This has the downside that the cross-correlation calculation performed on the entire page is less reliable, potentially giving a false negative. There are various ways that it could be determined that much of the page is blank. For example, this could be detected by performing a preliminary image analysis to identify blank sections of a page. Alternatively, in some cases, other information may be available about a page to indicate that it is a type of page in which much of the page is blank.

FIG. 12 illustrates a screenshot of the page of FIG. 11 but divided into smaller subsections. In this example, the screen image is divided into quarter sections (Q1, Q2, Q3, and Q4). This permits the difference computation to be isolated to the subsection that is not blank (Q1) resulting in a more accurate difference computation. As previously discussed, while dividing into quadrants is one option, more generally the number and arrangement of subsections could include at least two subsections, as the objective of segmentation is to identify page differences with greater accuracy.

Memoization

The capturing of images of UI pages is a resource heavy process. It was observed in one test by the inventors that consumption of CPU utilization increases during the evaluation process up to 50%. To reduce CPU usage a memoization process was developed to cache the previous evaluated pixels in the memory.

In one implementation, gray-scale pixels at full and quadrant level are cached, as they are the basic origin for evaluation purposes. (Note that if other sub-sectioning schemes besides quadrants are used, pixels may be cached at the level of the sub-sectioning (e.g., one half of the pixels of a page for a page divided into two subsections).

In one implementation, as soon as the target active window appears, the first screenshot is taken. Then the process of building a cache begins. Pixels are converted into grayscale for full screen images and for quadrants and they are cached. The screen's width and height may also be cached as a variable. When the next screenshot is taken, the process does not have to calculate the previous image's pixels, because the cache can be used.

When a page/context change is identified as having occurred, the cache is updated with the then pixel values. This means that for the the next comparison the process does not have to re-evaluate the pixel values.

Note that if the active window has been resized, the previously built cache won't be the relevant candidate to be taken up for further computations. To verify if the window has been resized, the new active window's width and height are compared with that of the cached one. For the case that the active window was resized, the process updates the cache with resized window image's pixels.

Empirically this resulted in a significant decrease in the number of computations done, as well as supporting the offloading resources.

As previously discussed, the page/context change detection engine 120 includes a screen pixel caching unit 120. The screen pixel caching unit 120 may be designed to build an initial cache for processing the computations. It may also be designed to identify if the cache needs to be re-built, and whether the cache needs to be updated. It may be designed to get pixels in grayscale and cache them. It may also be designed to identify that a window has been resized. In one implementation, the screen pixel caching unit is designed to cache both full and subsection-level pixels (e.g., quadrant level pixels)

Figure 13A:
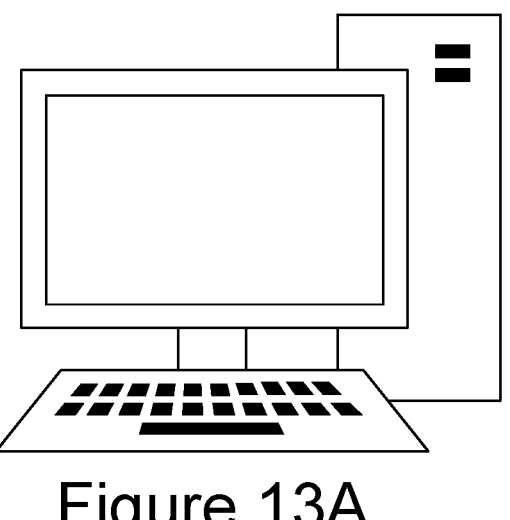
FIGS. 13A and 13B illustrate a general computer environment for deploying the page identification technique in accordance with an implementation.
Figure 13B:
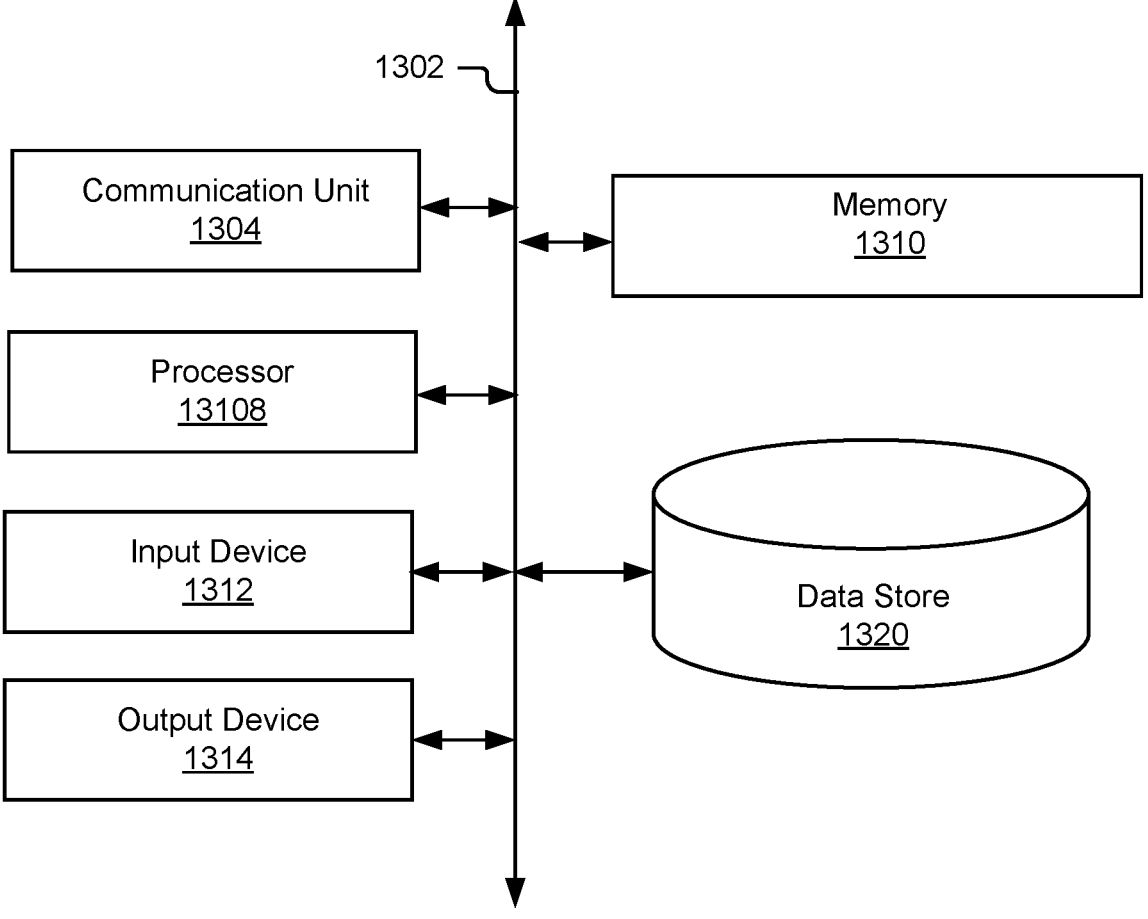

The page change identification engine 120 may be implemented as software instructions. It may, for example, be implemented to operate with other software on a user's desktop. Referring to FIG. 13A, the software instructions may be stored on a user's computer, which may in turn have conventional hardware components such as a memory 1310, data store 1320, output device 1314 (e.g., a display screen), communication bus 1302, an input device 1312, a processor 1308, and a communication unit 1304 to communicate with a computer network, such as a LAN, WAN, the internet, etc.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like New, Upload, Sync, and Open in One Drive.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method of detecting page changes of a graphical user interface (GUI) application screen, comprising:

detecting, by a page-change identification engine, a trigger condition based on at least one operating system event selected from mouse events, keyboard events, focus events, and reorder events;

in response to the trigger condition, capturing at least two screenshots of the GUI at different time instances;

dividing each captured screenshot into a plurality of spatial segments and identifying one or more non-blank segments containing active image content; computing, for each non-blank segment, a cross-correlation value between corresponding segments of the captured at least two screenshots;

determining that a page change has occurred when the cross-correlation value for any segment is below a predetermined threshold; and transmitting an indication of the detected page change to a digital adoption platform to dynamically update contextual guidance corresponding to a new application state.

2. The computer-implemented method of claim 1, wherein a cross-correlation function is evaluated based on a reference screenshot captured in response to the trigger condition and a subsequent screenshot.

3. The computer-implemented method of claim 1, wherein the trigger condition comprises a first trigger condition comprising detecting mouse events and keyboard events followed by a second trigger condition comprising detecting reorder events and focus events.

4. The computer-implemented method of claim 1, wherein the threshold value is a range between 0.5 to 1.0.

5. The computer-implemented method of claim 1, further comprising performing a stability test, based on screenshots of an application, to determine if the user interface is stable.

6. The computer-implemented method of claim 5, wherein the stability test is based on performing a cross-correlation check for at least two screenshots taken after detecting a change in page content.

7. The computer-implemented method of claim 1, further comprising performing at least one retry if a cross-correlation function does not have a value below a threshold value indicative of a page change.

8. The computer-implemented method of claim 1, wherein a sequence of at least two consecutive screenshots is converted into grayscale images to reduce the number of dimensions for analysis.

9. The computer-implemented method of claim 8, further comprising caching grayscale versions of at least a first screenshot in a sequence of at least two consecutive screenshots.

10. The computer-implemented method of claim 1, wherein a sequence of at least two consecutive screenshots comprises screenshots of at least two different color images, with the cross-correlation function being performed on color images.

11. A system for identifying page changes of a graphical user interface (GUI), comprising:

a page-change identification engine configured to:

detect a trigger condition based on at least one operating-system event selected from mouse events, keyboard events, focus events, and reorder events;

in response to detecting the trigger condition, capture at least two screenshots of the GUI at different time instances;

divide each captured screenshot into a plurality of spatial segments and identify one or more non-blank segments containing active image content;

compute, for each non-blank segment, a cross-correlation value between corresponding segments of the captured screenshots; and determine that a page change has occurred when the cross-correlation value for any segment is below a predetermined threshold; and a context-communication module configured to transmit an indication of a detected page change to a digital-adoption platform so that contextual guidance for the application is dynamically updated in response to the detected page change.

12. The system of claim 11, wherein the cross-correlation value is evaluated based on a reference screenshot captured in response to the trigger condition and a subsequent screenshot.

13. The system of claim 11, wherein the trigger condition comprises a first trigger condition comprising detecting mouse events and keyboard events followed by a second trigger condition comprising detecting reorder events and focus events.

14. The system of claim 11, wherein the threshold value is in a range between 0.5 to 1.0.

15. The system of claim 11, wherein the system is further configured to perform a stability test, based on screenshots of the application, to determine if the user interface is stable.

16. The system of claim 15, wherein the stability test is based on performing a cross-correlation check for at least two screenshots taken after detecting a change in page content.

17. The system of claim 11, wherein the system is further configured to perform at least one retry if a cross-correlation function does not have a value below a threshold value indicative of a page change.

18. The system of claim 11, wherein a sequence of at least two consecutive screenshots is converted into grayscale images to reduce the number of dimensions for analysis.

19. The system of claim 18, wherein the system is further configured to cache grayscale versions of at least a first screenshot in the sequence of at least two consecutive screenshots.

20. The system of claim 11, wherein a cross-correlation function is performed on screenshots of color images.

21. A computer-implemented method of detecting page changes of a graphical user interface (GUI) application screen, comprising:

determining if a trigger condition is satisfied for a page change, the trigger condition being based on a combination of at least two different operating system events associated with a likely page change of an application;

subsequent to satisfying the trigger condition, capturing a sequence of at least two screenshots of the application taken at different times, and comparing the at least two screenshots using a cross correlation function;

identifying a page change in response to the cross-correlation function having a value below a first threshold value indicative of a page change;

evaluating page stability using a stability score;

in response to identifying the page change and that the page is stable, providing an indication of the identified page change to a digital adoption platform to dynamically update contextual guidance corresponding to a new application state.

* * * * *